US012596949B2

(12) United States Patent
Jeong et al.

(10) Patent No.: US 12,596,949 B2
(45) Date of Patent: Apr. 7, 2026

(54) METHOD AND APPARATUS FOR LINEAR OPTICAL QUANTUM COMPUTING

(71) Applicant: Seoul National University R&DB foundation, Seoul (KR)

(72) Inventors: Hyunseok Jeong, Seoul (KR); Seok-Hyung Lee, Seoul (KR); Yong Siah Teo, Seoul (KR); Srikrishna Omkar, Toronto (CA)

(73) Assignee: Seoul National University R&DB foundation, Seoul (KR)

( * ) Notice: Subject to any disclaimer, the term of this patent is extended or adjusted under 35 U.S.C. 154(b) by 742 days.

(21) Appl. No.: 18/075,327

(22) Filed: Dec. 5, 2022

(65) Prior Publication Data

US 2024/0119334 A1     Apr. 11, 2024

(30) Foreign Application Priority Data

Sep. 23, 2022    (KR) ......................... 10-2022-0120561

(51) Int. Cl.
*G06N 10/40*        (2022.01)
*G06N 10/20*        (2022.01)

(52) U.S. Cl.
CPC ............. *G06N 10/40* (2022.01); *G06N 10/20* (2022.01)

(58) Field of Classification Search
None
See application file for complete search history.

(56) References Cited

U.S. PATENT DOCUMENTS

| | | | | |
|---|---|---|---|---|
| 9,858,531 | B1 * | 1/2018 | Monroe | G06N 10/40 |
| 11,308,416 | B2 * | 4/2022 | Pant | G06N 10/40 |
| 11,367,013 | B2 * | 6/2022 | Pant | G06N 3/08 |
| 12,026,587 | B2 * | 7/2024 | Pant | G06N 3/08 |
| 12,056,571 | B2 * | 8/2024 | Nickerson | H10D 62/405 |
| 12,056,572 | B2 * | 8/2024 | Nickerson | G06N 10/70 |
| 12,099,900 | B2 * | 9/2024 | Gimeno-Segovia | G06N 10/40 |
| 12,360,869 | B2 * | 7/2025 | Pant | G06N 3/08 |
| 2020/0401927 | A1 | 12/2020 | Nickerson et al. | |
| 2021/0027188 | A1 * | 1/2021 | Nickerson | H10D 48/3835 |
| 2022/0224996 | A1 * | 7/2022 | Nickerson | H04B 10/70 |
| 2024/0289665 | A1 * | 8/2024 | Pichler | G06N 10/20 |

(Continued)

FOREIGN PATENT DOCUMENTS

| | | |
|---|---|---|
| KR | 10-1149948 | 6/2012 |
| KR | 10-2022-0044944 | 4/2022 |

OTHER PUBLICATIONS

D.E. Browne et al., "Resource-efficient linear optical quantum computation," arXiv:quant-ph/0405157v2, Feb. 9, 2005, pp. 1-5. (Year: 2005).*

(Continued)

*Primary Examiner* — Leigh M Garbowski

(57)         ABSTRACT

A method for linear optical quantum computing includes configuring at least two first Greenberger-Horne-Zeilinger (GHZ) states consisting of three photons; configuring at least one second GHZ state consisting of four or more photons by firstly combining the at least two first GHZ states; generating at least one microcluster; forming a plurality of star clusters consisting of four side qubits around the central qubit; configuring Raussendorf-Harrington-Goyal (RHG) lattice by using the plurality of star clusters; and measuring at least one central qubit of the RHG lattice.

22 Claims, 22 Drawing Sheets

(56)                     References Cited

U.S. PATENT DOCUMENTS

2024/0303521 A1*   9/2024   Gimeno-Segovia ...   G06N 10/40
2025/0036996 A1*   1/2025   Puri ......................   G06N 10/70

OTHER PUBLICATIONS

R. Raussendorf et al., "A fault-tolerant one-way quantum computer," Annals of Physics 321, 2006 Elsevier, pp. 2242-2270. (Year : 2006).*

M. Varnava et al., "How good must single photon sources and detectors be for efficient linear quantum computation?," arXiv: quant-ph/0702044va, Jul. 20, 2007, 11 pages. (Year: 2007).*

S.-W. Lee et al., "Near-deterministic quantum teleportation and resource-efficient quantum computation using linear optics and hybrid qubits," Physical Review A 87, 022326 (2013), 9 pages. (Year: 2013).*

Y. Li et al., "Resource Costs for Fault-Tolerant Linear Optical Quantum Computing," Physical Review X 5, 041007, 2015 American Physical Society, 15 pages. (Year: 2015).*

S. Omkar et al., Supplemental Material for "Resource-efficient topological Fault-tolerant quantum computation with hybrid entanglement of light," Physical Review Letter 125.6 (2020), 5 pages. (Year: 2020).*

Office Action dated May 22, 2025 corresponding to Korean Patent Application No. 10-2020-0120561, 8 pages.

Omkar, Srikrishna et al., "Resource-efficient topological fault-tolerant quantum computation with hybrid entanglement of light", Physical Review Letter 125.6 (2020): 0650501. (Aug. 4, 2020).

Lee, Seung Woo et al., "Nearly deterministic Bell measurement for multiphoton qubits and its application to quantum information processing", Physical Review Letters 114.11 (2025): 113603. (Mar. 18, 2015).

Omkar, Srikrishna et al., "Highly photon-loss-tolerant quantum computing using hybrid qubits", Physical Review A 103.3 (2021): 032602. (Mar. 9, 2021).

* cited by examiner

FIG. 1C

Start

S200 — One is arbitrarily selected from possible combination graphs of the corresponding microcluster.

S202 — A variable $M_v$ is defined for each vertex v of the combination graph.

S204 — This equation, $M_e = \frac{2}{(1-\pi)^2}(M_{v_1} + M_{v_2})$, is defined for each line (e) of the combination graph.

S206 — Does it have one vertex?

No / Yes

End

S208 — A set of lines having the smallest cost $E_{(min,wgt)}$.

S210 — A color is given to the lines of the combined graph.

S212 — $E_{(min,wgt)}$ is divided into several groups according to the color, and choose the largest group $E_{mrg}$.

A

B

S218 — The line (e) belongs to the line (e) of $E_{mrg}$?

Yes / No

S220 — Two vertices $v_1, v_2$ connected by a line (e) are combined into one vertex ($v_e$).

S222 — The cost $M(v_e)$ of {$v_e$} is initialized to be equal to the cost $M_e$.

S224 — When the cost of the case that e' is connected to two different vertices $v_1$ and $v_2$ for each line (e') connected to $v_e$, the cost of e' is calculated as $M_{e'} = \frac{2}{(1-\pi)^2}(M_{v_1} + M_{v_2})$. When e' is connected to one vertex $v_2$, the cost of e' is calculated as $M_{e'} = \frac{2}{(1-\pi)^2}M_{v_2}$.

FIG.5A
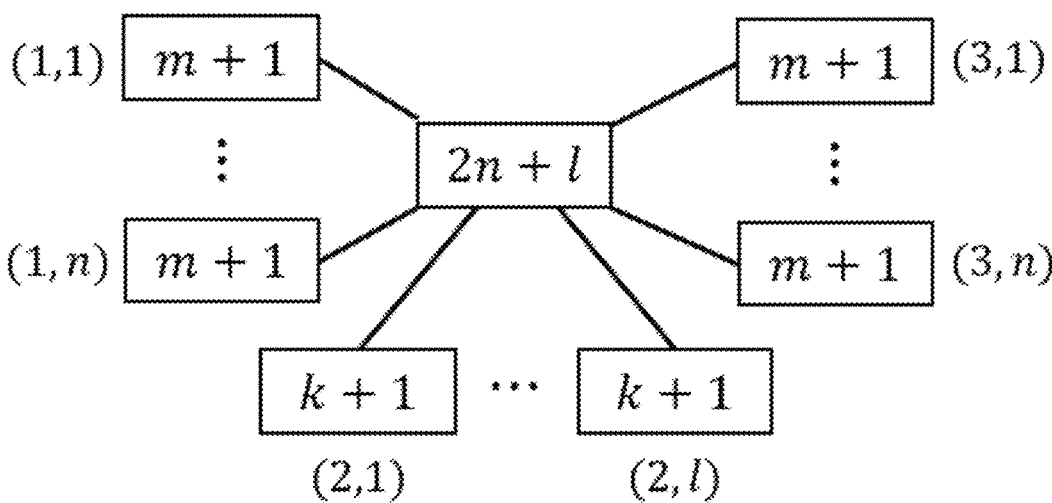
FIG.5B
$$2n + l$$
$$(1,*,H), (2,*,H), (3,*,H)$$
FIG. 5C
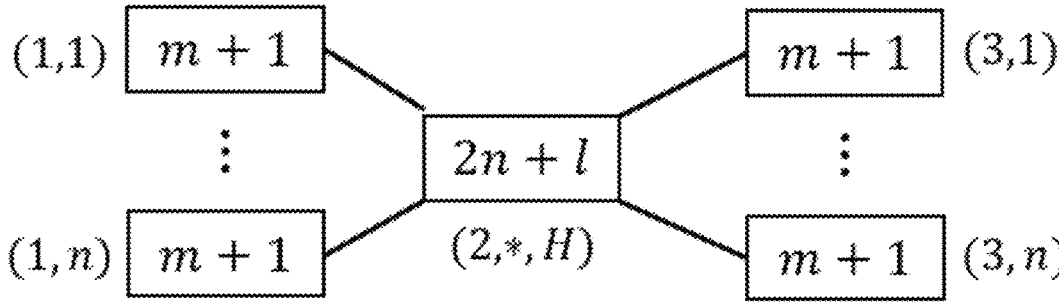

FIG. 6C
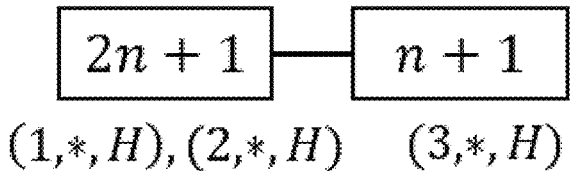
$(1,*,H),(2,*,H)$     $(3,*,H)$
FIG. 6D
$$\boxed{3}$$
$(1,1,H),(2,1,H),(3,1)$
FIG.7A
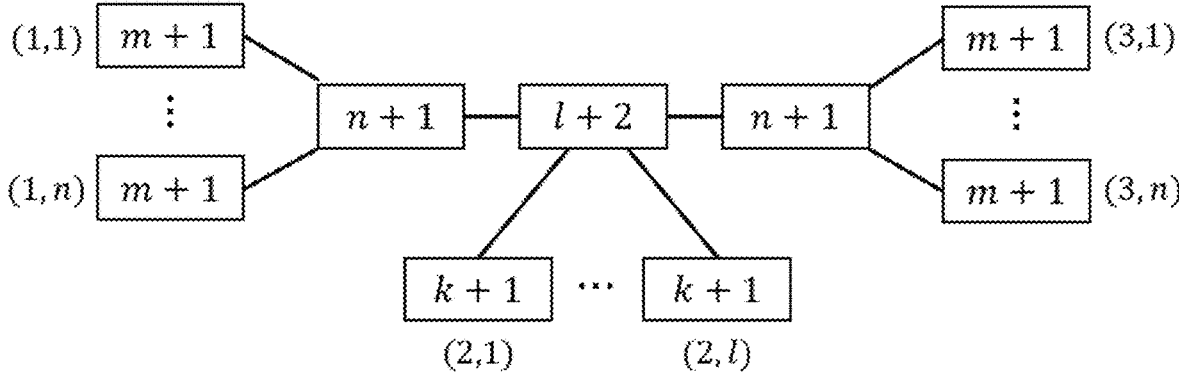

FIG.7B
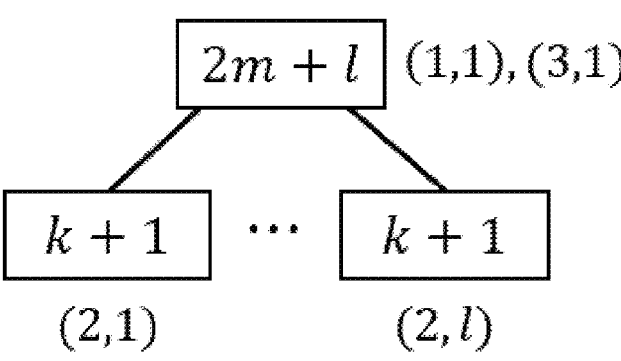
FIG.7C
$$2m + l$$
$$(1,1), (2,_*,H), (3,1)$$
FIG.7D
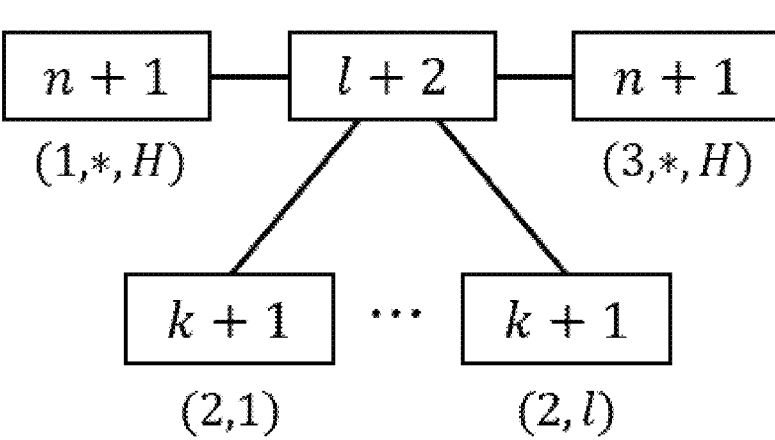

FIG.8B $$\boxed{n+1} - \boxed{n+2} - \boxed{n+1}$$

$(2,*,H) \qquad (1,*,H) \qquad (3,*,H)$

FIG.8C $$\boxed{m+1} - \boxed{2m+1}$$

$(1,1) \qquad (2,1),(3,1)$

FIG.8D $$\boxed{3}$$

Multi-photon BSM
BSM$_2$

Block level BSM
BSM$_1$

Single photon BSM
BSM$_0$

METHOD AND APPARATUS FOR LINEAR OPTICAL QUANTUM COMPUTING

CROSS-REFERENCE TO RELATED APPLICATION

This application claims priority of Korean Patent Application No. 10-2022-0120561, filed on Sep. 23, 2022, in the KIPO (Korean Intellectual Property Office), the disclosure of which is incorporated herein entirely by reference.

BACKGROUND OF THE INVENTION

Field of the Invention

The present invention relates to a quantum computing technology, and more particularly, to linear optical quantum computing using parity state coding.

Description of the Related Art

A quantum computer is a computational machine which processes data by using quantum mechanical phenomena such as entanglement and superposition. Also, such a method is called 'a quantum computing'. In a classical (or traditional) computer, the amount of data is measured in bits, in the quantum computer the amount of data is measured in qubits. The basic principle of quantum computation is based on the facts that quantum properties of particles may represent and structure data, and quantum mechanisms may be devised and made to perform operations on these data.

Among the quantum computing, linear optical quantum computing (LOQC) includes a quantum computing method using a photon emitter and a photon detector in addition to basic linear optical mechanisms such as a beam splitter and a phase shifter. As a basic resource for implementing the LOQC, a quantum state (or a set of cluster states) called a Raussendorf-Harrington-Goyal (RHG) lattice is mainly used. The RHG lattice is error-tolerant and enables universal quantum computing. However, since it is very difficult to form the RHG lattice at once, a method for combining small quantum states of 3 to 5 photons through Bell-state measurement (BSM) is used. However, there are several obstacles for implementing the LOQC. First of all, the success probability of the BSM in a linear optical system is theoretically limited, and it is impossible to achieve a success probability greater than 50% without additional resources. Furthermore, the photons may be lost at any time during the quantum computing process. Due to the above two problems, there is a problem in that the RHG lattice may not be formed as precise as the quantum computing is possible. The conventional methods for solving these problems still have many shortcomings, and although the BSM has been partially improved, there is still a problem that the effect due to photon loss is not sufficiently considered or that too many resources are required.

Accordingly, there is a need for a linear optical quantum computing technology which minimizes the failure rate of the BSM, has sufficient tolerance to loss of photons, and does not consume too many resources at the same time.

SUMMARY OF THE INVENTION

An The technical object to be achieved by the present invention is to provide a method for linear optical quantum computing which has a small resource requirement and may effectively overcome environmental factors such as a theoretical limit of the success probability of BSM and a photon loss.

In addition, the technical object to be achieved by the present invention is to provide an apparatus for linear optical quantum computing which has a small resource requirement and may effectively overcome environmental factors such as a theoretical limit on the success probability of BSM and environmental factors such as photon loss.

The objects to be achieved by the present invention are not limited to the above-mentioned ones, and other objects not mentioned will be understood by those skilled in the art from the following description.

According to one embodiment of the present invention, there is provided a method for linear optical quantum computing comprising: configuring at least two first Greenberger-Horne-Zeilinger (GHZ) states consisting of three photons; configuring at least one second GHZ state consisting of four or more photons by firstly combining the at least two first GHZ states; generating at least one microcluster of type 1 comprising a specific entangled state consisting of three multiphoton qubits defined as (n, m) parity-state encoding for two side qubits and (l, k) parity-state encoding for one central qubit and at least two or more microcluster of type 2 containing a specific entangled state consisting of three multiphoton qubits defined by (n, m) parity state coding for three side qubits, by secondly combining the first GHZ state, the second GHZ state, or a combination thereof; forming a plurality of star clusters consisting of four side qubits around the central qubit by thirdly combining the at least one microcluster of type 1 and the at least two microclusters of type 2; configuring Raussendorf-Harrington-Goyal (RHG) lattice by using the plurality of star clusters; and measuring at least one central qubit of the RHG lattice.

In one embodiment, the method may include the step for configuring the at least one second GHZ state may include selecting a first photon from any one of the at least two first GHZ states; selecting a second photon from another first GHZ state; and performing a first Bell-state measurement (BSM) based on the first photon and the second photon. The method may include selecting a third photon from any one of the at least two first GHZ states, selecting a fourth photon from any one of at least one second GHZ state; and performing a second BSM based on the third photon and the fourth photon, or selecting a fifth photon from any one of the at least two second GHZ states, selecting a sixth photon from another second GHZ state, and performing a third BSM based on the fifth photon and the sixth photon. The first BSM or the second BSM or the third BSM may include a single photon BSM comprising a plurality of polarizing beam splitters, a plurality of wave plates and a plurality of photon detectors. The photon detector may include any one of an on-off detector and a single-photon resolving detector.

In one embodiment, H-configuration for determining the quantum state of side qubits in the microcluster of type 1 and type 2 is used, the H-configuration includes a H-configuration of type 1 (HIC) and a H-configuration of type 2 (HIS), the HIC of the microcluster of type 1 is defined by Equation a, and the HIS of the microcluster of type 1 is defined by Equation b.

$$\frac{1}{\sqrt{2}}(|0_{(n,m)}\rangle|0_{(l,k)}\rangle|0_{(n,m)}\rangle+|1_{(n,m)}\rangle|1_{(l,k)}\rangle|1_{(n,m)}\rangle) \qquad \text{[Equation a]}$$

-continued $$\frac{1}{\sqrt{2}}(|+_{(n,m)}\rangle|0_{(l,k)}\rangle|+_{(n,m)}\rangle+|-_{(n,m)}\rangle|1_{(l,k)}\rangle|-_{(n,m)}\rangle) \quad \text{[Equation b]}$$

The following equation is defined as $$|+_{(n,m)}\rangle = \frac{1}{\sqrt{2}}(|0_{(n,m)}\rangle+|1_{(n,m)}\rangle) \text{ and } |+_{(l,k)}\rangle$$

is similarly defined.

In an embodiment, H-configuration for determining the quantum state of side qubits in the microcluster of type 2 is used, the H-configuration includes H-configuration of a type 1 (HIC) and a H-configuration of a type 2 (HIS), the HIC of the microcluster of type 2 is defined by Equation c, and the HIS of the microcluster of type 2 is defined by Equation d.

$$\frac{1}{\sqrt{2}}(|0_{(n,m)}\rangle|0_{(n,m)}\rangle|+_{(n,m)}\rangle+|1_{(n,m)}\rangle|1_{(n,m)}\rangle|-_{(n,m)}\rangle) \quad \text{[Equation c]}$$

$$\frac{1}{\sqrt{2}}(|0_{(n,m)}\rangle|+_{(n,m)}\rangle|+_{(n,m)}\rangle+|1_{(n,m)}\rangle|-_{(n,m)}\rangle|-_{(n,m)}\rangle) \quad \text{[Equation d]}$$

In one embodiment the step for configuring the microcluster of type 1 and type 2 may comprise: at least one of selecting a first photon from any one of the at least two first GHZ states, selecting a second photon from another first GHZ state, and performing a first fusion based on the first photon and the second photon, selecting a third photon from any one of the first GHZ states, selecting a fourth photon from any one of the second GHZ states, and performing a second fusion based on the third photon and the fourth photon, and selecting a fifth photon from any one of the second GHZ states, selecting a sixth photon from another second GHZ state, and performing a third fusion based on the fifth photon and the sixth photon.

In cases of m=k=1 for a first H-configuration of the microcluster of type 1 (HIC), n=k=1 for a second H-configuration of the microcluster of type 1 (HIS), and n=m=1 of the microcluster of the type 2, the first fusion, the second fusion, and the third fusion are not performed, and a single photon Hadamard gate is applied to at least some or all of the photons not participating in the first fusion, the second fusion and the third fusion. The first fusion, the second fusion or the third fusion may be configured by a single photon fusion comprising a plurality of polarizing beam splitters, a plurality of wave plates and a plurality of photon detectors, and the photon detector may include any one of an on-off detector and a single-photon resolving detector. Each single-photon Hadamard gate may consist of one waveplate.

In one embodiment, a step for configuring the plurality of star clusters comprises: performing a first multi-photon BSM based on a first side qubit of the microcluster of type 1 and a second side qubit of any one of the microcluster of type 2; and performing a second multi-photon BSM based on the third side qubit of the microcluster of type 1 and the second side qubit of another of the microcluster of type 2, and the first side qubits and third side qubits of the microcluster of type 1 and the second side qubits of the microcluster of type 2 are removed through the first multi-photon BSM and the second multi-photon BSM, and the star cluster is composed of first central qubits of the microcluster of type 1, first side qubits and third side qubits of the microcluster of type 2.

In an embodiment, the step for forming of the plurality of star clusters may a concatenated BSM which performs block level BSM n times and performs a single-photon BSM m times for a level BSM of each block when two multiphoton qubits are defined as (n,m) parity state coding.

In one embodiment, a step for configuring the Raussendorf-Harrington-Goyal (RHG) lattice by using the plurality of star clusters comprises: performing a third multi-photon BSM by using a first side qubit of a first star cluster and a third side qubit of a second star cluster among the plurality of star clusters; and performing a fourth multi-photon BSM by using a third side qubit of the first star cluster and a first side qubit of the second star cluster.

In an embodiment, the first star cluster is disposed at a center of a corresponding plane constituting the RHG lattice, and the second star cluster is disposed at a center of a line segment constituting the corresponding plane. The plurality of star clusters may be disposed at a center of each face constituting the RHG lattice and a center of a line segment constituting each face. Only the central qubits may be remained in the RHG lattice.

According to another embodiment of the present invention, there is provided ae method for linear optical quantum computing which may comprise: determining a sequence of a plurality of single photon fusions and a plurality of single photon BSMs expressed by a shape of the combination graph and a line between the vertices by performing a resource optimization algorithm for a combination graph consisting of a plurality of vertices representing an arbitrary microcluster and lines connecting the vertices; configuring at least two first GHZ states consisting of three photons based on the shape of the combination graph; generating at least one microcluster of type 1 including a specific entangled state consisting of three multiphoton qubits defined by (n, m) parity-state encoding for two side qubits and (l, k) parity-state encoding for one central qubit, and at least two or more microclusters of type 2 comprising a specific entangled state consisting of three multiphoton qubits defined by (n, m) parity state coding for three side qubits, based on the sequence of the single photon fusions and the single photon BSMs between the configured first GHZ states; forming a plurality of star clusters consisting of four side qubits around the central qubit by combining the at least one microcluster of type 1 and the at least two microclusters of type 2; configuring an RHG lattice by using the plurality of star clusters; and measuring at least one central qubit of the RHG lattice.

According to another embodiment of the present invention, there may be provided an apparatus for linear optical quantum computing comprising at least one processor, at least one single-photon BSM and at least one multi-photon BSM operating under the control of the processor. The at least one processor may include commands for configuring at least two first Greenberger-Horne-Zeilinger (GHZ) states consisting of three photons, configuring at least one second GHZ state consisting of four or more photons by firstly combining the at least two first GHZ states, generating at least one microcluster of type 1 comprising a specific entangled state consisting of three multiphoton qubits defined as (n, m) parity-state encoding for two side qubits and (l, k) parity-state encoding for one central qubit and at least two or more microcluster of type 2 containing a specific entangled state consisting of three multiphoton qubits defined by (n, m) parity state coding for three side qubits, by secondly combining the first GHZ state, the second GHZ state, or a combination thereof, forming a plurality of star clusters consisting of four side qubits around the central qubit by thirdly combining the at least one microcluster of type 1 and the at least two microclusters of type 2, configuring Raussendorf-Harrington-Goyal (RHG) lattice by using the plurality of star clusters, and measuring at least one central qubit of the RHG lattice.

The at least one processor may a command for controlling to select a first photon from any one of the at least two first GHZ states, select a second photon from another first GHZ state, and perform a first Bell-state measurement (BSM) based on the first photon and the second photon. The at least one processor a command for selecting a third photon from any one of the at least two first GHZ states, selecting a fourth photon from any one of at least one second GHZ state; and performing a second BSM based on the third photon and the fourth photon, or the at least one processor includes a command for selecting a fifth photon from any one of the at least two second GHZ states, selecting a sixth photon from another second GHZ state, and performing a third BSM based on the fifth photon and the sixth photon. The first BSM or the second BSM or the third BSM include a single photon BSM comprising a plurality of polarizing beam splitters, a plurality of wave plates and a plurality of photon detectors, and the photon detector includes any one of an on-off detector and a single-photon resolving detector.

In one embodiment, H-configuration for determining the quantum state of side qubits in the microcluster of type 1 and type 2 is used, the H-configuration includes a H-configuration of type 1 (HIC) and a H-configuration of type 2 (HIS), the HIC of the microcluster of type 1 is defined by Equation a, and the HIS of the microcluster of type 1 is defined by Equation b.

$$\frac{1}{\sqrt{2}}(|0_{(n,m)}\rangle|0_{(l,k)}\rangle|0_{(n,m)}\rangle+|1_{(n,m)}\rangle|1_{(l,k)}\rangle|1_{(n,m)}\rangle) \quad \text{[Equation a]}$$

$$\frac{1}{\sqrt{2}}(|+_{(n,m)}\rangle|0_{(l,k)}\rangle|+_{(n,m)}\rangle+|-_{(n,m)}\rangle|1_{(l,k)}\rangle|-_{(n,m)}\rangle) \quad \text{[Equation b]}$$

The following equation is defined as $$|+_{(n,m)}\rangle = \frac{1}{\sqrt{2}}(|0_{(n,m)}\rangle+|1_{(n,m)}\rangle), \text{ and } |+_{(l,k)}\rangle$$

is similarly defined.

In an embodiment, the H-configuration includes H-configuration of a type 1 (HIC) and a H-configuration of a type 2 (HIS), the HIC of the microcluster of type 2 is defined by Equation c, and the HIS of the microcluster of type 2 is defined by Equation d.

$$\frac{1}{\sqrt{2}}(|0_{(n,m)}\rangle|0_{(n,m)}\rangle|+_{(n,m)}\rangle+|1_{(n,m)}\rangle|1_{(n,m)}\rangle|-_{(n,m)}\rangle) \quad \text{[Equation c]}$$

$$\frac{1}{\sqrt{2}}(|0_{(n,m)}\rangle|+_{(n,m)}\rangle|+_{(n,m)}\rangle+|1_{(n,m)}\rangle|-_{(n,m)}\rangle|-_{(n,m)}\rangle) \quad \text{[Equation d]}$$

In one embodiment, the at least one processor may include at least one of a command for selecting a first photon from any one of the at least two first GHZ states, selecting a second photon from another first GHZ state, and performing a first fusion based on the first photon and the second photon. a command for selecting a third photon from any one of the first GHZ state, selecting a fourth photon from any one of the second GHZ state, and performing a second fusion based on the third photon and the fourth photon, and a command for selecting a fifth photon from any one of the at least two second GHZ states, selecting a sixth photon from another second GHZ state, and performing a third fusion based on the fifth photon and the sixth photon. In cases of m=k=1 for a first H-configuration of the microcluster of type 1 (HIC), n=k=1 for a second H-configuration of the microcluster of type 1 (HIS), and n=m=1 of the microcluster of the type 2, the first fusion, the second fusion, and the third fusion are not performed, and a single photon Hadamard gate is applied to at least some or all of the photons not participating in the first fusion, the second fusion and the third fusion. The first fusion or the second fusion or the third fusion may consist of a single photon fusion comprising a plurality of polarizing beam splitters, a plurality of wave plates and a plurality of photon detectors, and the photon detector may include any one of an on-off detector and a single-photon resolving detector. Each single-photon Hadamard gate may consist of one waveplate.

In one embodiment, the at least one processor control the multi-photon BSM, so that a first multi-photon BSM is performed based on a first side qubit of the microcluster of type 1 and a second side qubit of any one of the microcluster of type 2, and a second multi-photon BSM is performed based on a third side qubit of the microcluster of type 1 and a second side qubit of another one of the microcluster of type 2, and the first side qubits and third side qubits of the microcluster of type 1 and the second side qubits of the microcluster of type 2 are removed through the first multi-photon BSM and the second multi-photon BSM, and the star cluster is composed of a first central qubit of the microcluster of type 1 and first side qubits and third side qubits of the microclusters of type 2. In one embodiment, the at least one processor controls the multi-photon BSM, so that a third multi-photon BSM is performed based on a first side qubit of a first star cluster and a third side qubit of a second star cluster of the plurality of star clusters, and a fourth multi-photon BSM is performed based on a third side qubit of the first star cluster and a first side qubit of the second star cluster. The first star cluster may be disposed at a center of a corresponding plane constituting the RHG lattice, and the second star cluster may be disposed at a center of a line segment constituting the corresponding plane. Only the central qubits may be remained in the RHG lattice.

According to embodiments of the present invention, at least one microcluster of type 1 comprising a specific entangled state of three qubits defined by (n, m) parity-state encoding for two side qubits, and (l, k) parity state coding for one central qubit due to combination of the GHZ state containing three or more photons, and at least two or more microcluster of type 2 containing a specific entangled state consisting of three qubits defined by (n, m) parity state coding for three side qubits are generated. A plurality of star clusters composed of four side qubits are formed around the central qubit by combining one of the microcluster of type 1 and two of the microcluster of type 2, and the plurality of star clusters are used to configure a Raussendorf-Harrington-Goyal (RHG) lattice. Therefore, it is possible to provide a method for linear optical quantum computing which has small resource requirements and may effectively overcome environmental factors such as photon loss and a theoretical limit on the success probability of BSM, and apparatus therefor.

BRIEF DESCRIPTION OF THE DRAWINGS

The above and other features and advantages will become more apparent to those of ordinary skill in the art by describing in detail exemplary embodiments with reference to the attached drawings, in which:

FIG. 1C is a flow chart illustrating a resource optimization method using a combination graph according to an embodiment of the present invention.

FIG. 2A and FIG. 2B are diagrams illustrating an example configuring a second GHZ state consisting of N photons by using a first GHZ (Greenberger-Horne-Zeilinger) state consisting of three photons in an embodiment of the present invention.

FIG. 5A to 5D are diagrams illustrating a process for generating a microcluster of type 1 according to an embodiment of the present invention.

FIG. 6A to FIG. 6D are diagrams illustrating a process for generating a microcluster of type 2 according to an embodiment of the present invention.

FIG. 7A to FIG. 7F are diagrams illustrating a process for generating a microcluster of type 1 according to another embodiment of the present invention.

FIG. 8A to FIG. 8D are diagrams illustrating a process for generating a microcluster of type 2 according to another embodiment of the present invention.

FIG. 13 is a configuration diagram of a multi-photon BSM (Bell-state measurement) according to an embodiment of the present invention.

FIG. 14A is a diagram illustrating a Raussendorf-Harrington-Goyal (RHG) lattice according to an embodiment of the present invention, and FIG. 14B is a diagram illustrating a method for configuring an RHG lattice by using a star cluster.

In the following description, the same or similar elements are labeled with the same or similar reference numbers.

DETAILED DESCRIPTION

Figure 1A:
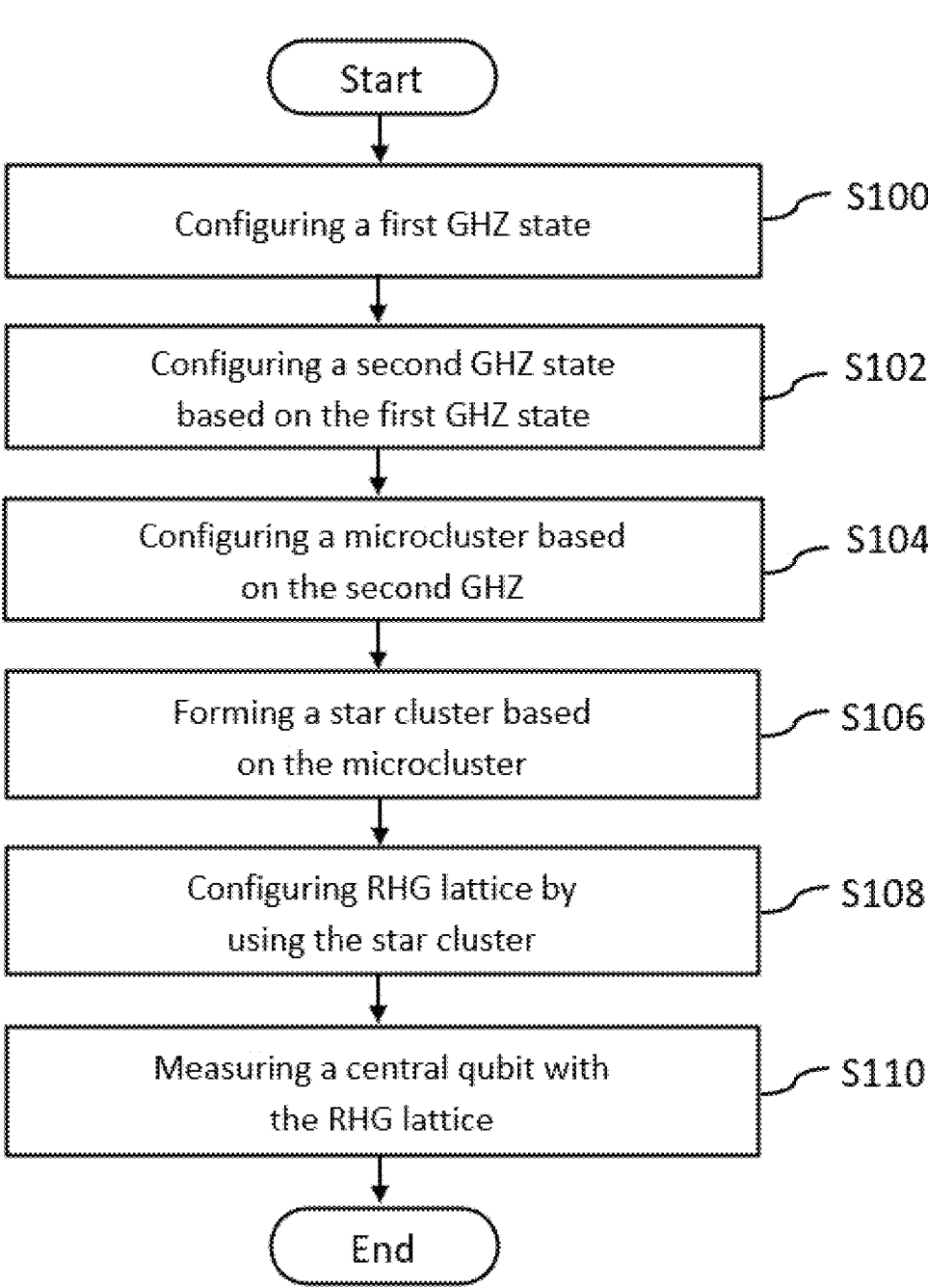
FIG. 1A-FIG. 1B are flowcharts illustrating a method for linear optical quantum computing according to an embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

As used herein, the term "qubit" is a basic unit when calculating with a quantum computer, and is referred to as a qudit or quantum bit. The term, "cluster state" refers to a quantum state constructed by applying controlled-Z gates according to a predetermined structure to several qubits having a state of $(|0>+|1>)/\sqrt{2}$. Here, $|1>|0>$ and are the base states of qubits, which may vary depending on the type of encoding. Since it is difficult to construct a quantum state composed of many qubits by directly applying a controlled-Z gate in an optical system, in the present invention, a microcluster state composed of few qubits is formed, and microclusters are combined by multiphoton Bell-state measurement (BSM) to form larger cluster states. In addition, the term, "Raussendorf-Harrington-Goyal (RHG) lattice" refers to a kind of cluster state having a three-dimensional structure. The term, "measurement-based quantum computing (MBQC)" refers to quantum computing made by measuring each qubit of a cluster state. The use of RHG lattices allows universal and loss-tolerant quantum computing to be achieved. The term, "Bell-state measurement (BSM)" means measuring two qubits by doing at least two of the bell states as a basis. Here, the bell state is defined as) $|\Phi_{\pm}\rangle = (|00\rangle \pm |11\rangle )/\sqrt{2}$, $|\Psi_{\pm}\rangle = (|01\rangle \pm |10\rangle )/\sqrt{2}$. The term, "Hadamard gate" refers to a unitary operation which changes a state $|0\rangle$ into a state $(|0\rangle+|1\rangle)/\sqrt{2}$ and a state $|1\rangle$ into a state $(|0\rangle-|1\rangle)/\sqrt{2}$ for one qubit. The term, "single photon qubit" means a qubit consisting of one photon per qubit. The term, "a single photon BSM" refers to BSM for single photon qubit. The term, "a single-photon Hadamard gate" refers to a Hadamard gate for single-photon qubit. The term, "a single-photon fusion" means applying a single-photon Hadamard gate to one of the two photons and then performing a single-photon BSM on both photons. The term, "multiphoton qubit" refers to a qubit which consists of several photons per qubit and is defined by (n, m) parity state coding for any natural number n, m. The term, "multiphoton BSM" means BSM for multiphoton qubits. The term, "multiphoton Hadamard gate" refers to a Hadamard gate for multiphoton qubits. The term "multiphoton fusion" means a process for applying a multiphoton Hadamard gate to one of the two multiphoton qubits and then measuring the two qubits with a multiphoton BSM.

FIG. 1A is a flowchart illustrating a method for linear optical quantum computing according to an embodiment of the present invention.

Referring to FIG. 1A, the method for linear optical quantum computing may comprise: a step S100 for configuring at least two first Greenberger-Horne-Zeilinger (GHZ) states consisting of three photons; a step S102 for configuring at least one second GHZ state consisting of four or more photons by firstly combining the at least two first GHZ states; a step S104 for generating at least one microcluster of type 1 comprising a specific entangled state consisting of three multiphoton qubits defined as (n, m) parity-state encoding for two side qubits and (l, k) parity-state encoding for one central qubit and at least two or more microcluster of type 2 containing a specific entangled state consisting of three multiphoton qubits defined by (n, m) parity state coding for three side qubits by secondly combining the first GHZ state, the second GHZ state, or a combination thereof, a step S106 for forming a plurality of star clusters consisting of four side qubits around the central qubit by thirdly combining the at least one microcluster of type 1 and the at least two microclusters of type 2, a step S108 for configuring Raussendorf-Harrington-Goyal (RHG) lattice by using the plurality of star clusters; and a step S110 for measuring at least one central qubit of the RHG lattice.

In the field of quantum information theory, a GHZ state is defined as a specific type of entangled quantum state which includes at least three subsystems (particle states (e.g., photons), qubits, or qudits), it is possible to display the entangled quantum state for a dog photon. Here, N is a natural number of 3 or more.

$$|GHZ_N\rangle = \frac{1}{\sqrt{2}}(|0\rangle^{\otimes N} + |1\rangle^{\otimes N}) \qquad \text{[Equation 1]}$$

Here, $|GHZ_N\rangle$ denotes the superposition of two perpendicular quantum states for N photons, and $|0\rangle$ and $|1\rangle$ are referred to as two perpendicular single-photon states, respectively. $|0\rangle$ and $|1\rangle$ may be defined as single-photon polarization encoding using a horizontally and vertically polarized single-photon state as a basis, respectively.

In one embodiment, the step for configuring the at least one second GHZ state may include selecting a first photon from any one of the first GHZ states of the at least two first GHZ states and selecting a second photon from another first GHZ state, and performing a first Bell-state measurement BSM based on the first photon and the second photon. In addition, a step for selecting a third photon from any one of the first GHZ states of the first GHZ state and selecting a fourth photon from the second GHZ state of any one of the second GHZ states; and performing a second BSM based on the third photon and the fourth photon may be included. In addition, a step for selecting a fifth photon from the second GHZ state of any one of the at least two second GHZ states, selecting a sixth photon from the other second GHZ state, and performing a third BSM based on the fifth photon and the sixth photon may be included. The first BSM or the second BSM or the third BSM may include a single photon BSM comprising a plurality of polarizing beam splitters, a plurality of wave plates and a plurality of photon detectors. The photon detector may include any one of an on-off detector and a single-photon resolving detector. Specifically, when single-photon BSM is applied by selecting one photon from GHZ-$N_1$ and GHZ-$N_2$ when any natural number $N_1$, $N_2 \geq 3$, GHZ-$(N_1-N_2-2)$ may be generated. GHZ-$N_1$ refer to a GHZ state consisting of $N_1$ photons, GHZ-$N_2$ refer to a GHZ state consisting of $N_2$ photons, and GHZ-$(N_1+N_2-2)$ refer to a GHZ state consisting of $(N_1+N_2-2)$ photons. Here, the photon selected photon from each of GHZ-$N_1$ and GHZ-$N_2$ is removed through single-photon BSM, and GHZ-$(N_1+N_2-2)$ generated by combining GHZ-$N_1$ and GHZ-$N_2$ based on single-photon BSM has a quantum state consisting of $(N_1+N_2-2)$ photons. A detailed description of the step for configuring the second GHZ state will refer to FIGS. 2A and 2B to be described later, and FIG. 3 to be described later will be referred to for a detailed description of the single-photon BSM.

In one embodiment, the microcluster of type 1 and the microcluster of type 2 refer to a specific entangled state composed of three multiphoton qubits defined by parity state coding, and they may be defined differently as follows according to the first and second H-configurations. The (n, m)-parity-state encoding may be defined as in [Equation 2] below.

$$|0_{(n,m)}\rangle := 2^{-\frac{nm}{2}}[|H\rangle^{\otimes m} + |V\rangle^{\otimes m}]^{\otimes n} \qquad \text{[Equation 2]}$$

$$|1_{(n,m)}\rangle := 2^{-\frac{nm}{2}}[|H\rangle^{\otimes m} - |V\rangle^{\otimes m}]^{\otimes n}$$

When parity state coding defines quantum states, multiphoton qubits may be defined on the basis of $|0_{(n,m)}\rangle$ and $|1_{(n,m)}\rangle$, and one multiphoton qubit consists of n blocks, and each block consists of m photons, so that one multiphoton qubit may contain n×m photons. The "basic type" of the microcluster of type 1 and the "basic type" of the microcluster of type 2 are defined by [Equation 3] and [Equation 4], respectively, and these may be defined as cluster states in which three multiphoton qubits are linearly connected.

$$\frac{1}{\sqrt{2}}(|+_{(n,m)}\rangle|0_{(l,k)}\rangle|+_{(n,m)}\rangle + |-_{(n,m)}\rangle|1_{(l,k)}\rangle|-_{(n,m)}\rangle) \qquad \text{[Equation 3]}$$

-continued $$\frac{1}{\sqrt{2}}(|+_{(n,m)}\rangle|0_{(n,m)}\rangle|+_{(n,m)}\rangle+|-_{(n,m)}\rangle|1_{(n,m)}\rangle|-_{(n,m)}\rangle) \qquad \text{[Equation 4]}$$

Here, $$|+_{(n,m)}\rangle = \frac{1}{\sqrt{2}}(|0_{(n,m)}\rangle+|1_{(n,m)}\rangle), \text{ and } |+_{(l,k)}\rangle$$

may be similarly defined. n and m are natural numbers, which are variables for determining parity state encoding of side qubits, and l and k are natural numbers, which are variables for determining parity state encoding of central qubits.

The process for forming star clusters and RHG lattice which will be described later may be accomplished by performing multiphoton fusion on side qubits in the basic types of microclusters of type 1 and type 2. In addition, as described above, multiphoton fusion may be achieved by applying a multiphoton Hadamard gate to one of the two multiphoton qubits and performing multiphoton BSM to the two multiphoton qubits. Instead of physically directly applying a multiphoton Hadamard gate on the prototype of the microclusters of type 1 and type 2, it is possible to directly form a microcluster which is a quantum state after a multiphoton Hadamard gate is properly applied to the lateral qubit of a basic type, and then to form an RHG lattice by using only multi-photon BSM. Here, since the multiphoton Hadamard gate may be operated by arbitrarily selecting one of the two multiphoton qubits participating in the multiphoton fusion, the shape of the microcluster which will be described later changes depending on the location of the multiphoton Hadamard gate. H-configuration determines this, and two examples are the first H-configuration (HIC) and the second H-configuration (HIS). A detailed description of the first to second H-configurations may refer to FIGS. 4 to 11F, which will be described later.

The microcluster of type 1 is defined by applying a multiphoton Hadamard gate to the first and third multiphoton qubits in the basic form of [Equation 3] when the first H-configuration (HIC) is used, and when the second H-configuration (HIS) is used, it is defined same as the basic form of [Equation 4]. If this is expressed as a formula, it is the same as [Equation 5] and [Equation 6], respectively.

$$\frac{1}{\sqrt{2}}(|0_{(n,m)}\rangle|0_{(l,k)}\rangle|0_{(n,m)}\rangle+|1_{(n,m)}\rangle|1_{(l,k)}\rangle|1_{(n,m)}\rangle) \qquad \text{[Equation 5]}$$

$$\frac{1}{\sqrt{2}}(|+_{(n,m)}\rangle|0_{(l,k)}\rangle|+_{(n,m)}\rangle+|-_{(n,m)}\rangle|1_{(l,k)}\rangle|-_{(n,m)}\rangle) \qquad \text{[Equation 6]}$$

The microcluster of type 1 has a specific entangled state consisting of three multiphoton qubits (one central qubit and two side qubits) defined by parity state coding. The central qubit may be a multiphoton qubit disposed at the center of a star cluster to be described later, and the side qubit may refer to a multiphoton qubit disposed around the center of a star cluster to be described later.

In addition, the microcluster of type 2 is defined by applying a multiphoton Hadamard gate to the first multiphoton qubit in the basic form of [Equation 4] when the first H-configuration (HIC) is used, and it is defined by applying a multiphoton Hadamard gate to the first and second multiphoton qubits in the basic form of [Equation 4] when the second H-configuration (HIS) is used. If this is expressed as a formula, it is the same as [Equation 7] and [Equation 8], respectively.

$$\frac{1}{\sqrt{2}}(|0_{(n,m)}\rangle|0_{(n,m)}\rangle|+_{(n,m)}\rangle+|1_{(n,m)}\rangle|1_{(n,m)}\rangle|-_{(n,m)}\rangle) \qquad \text{[Equation 7]}$$

$$\frac{1}{\sqrt{2}}(|0_{(n,m)}\rangle|+_{(n,m)}\rangle|+_{(n,m)}\rangle+|1_{(n,m)}\rangle|-_{(n,m)}\rangle|-_{(n,m)}\rangle) \qquad \text{[Equation 8]}$$

Similarly, the microcluster of type 2 has a specific entangled state consisting of three multiphoton qubits (i.e., three lateral qubits) defined by parity state coding.

In one embodiment, the step for configuring the type 1 and microcluster of type 2 may comprise: selecting a first photon from a first GHZ state of any one of the at least two first GHZ states, selecting a second photon from the other first GHZ state; and performing a first fusion based on the first photon and the second photon. Furthermore, the step for configuring the type 1 and microcluster of type 2 may further include a step for selecting a third photon from any one of the first GHZ states of the first GHZ state and selecting a fourth photon from any one of the second GHZ states of the second GHZ state; and a step for performing a second fusion based on the third photon and the fourth photon. Furthermore, it may include a step for selecting a fifth photon from the second GHZ state of any one of the at least two second GHZ states, selecting a sixth photon from the other second GHZ state; and performing a third fusion based on the fifth photon and the sixth photon. In connection with FIG. 5B, FIG. 6B, and FIG. 7C and FIG. 8D to be described later, the first fusion, the second fusion, and the third may not be performed for the first GHZ state, or the second GHZ state. Further, in FIGS. 5B to 5D, 6C, 6D, 7C to 7F and FIGS. 8B and 8D, a single-photon Hadamard gate may be applied to some or all of the photons which do not participate in the first fusion, the second fusion, and the third fusion. The first fusion or the second fusion or the third fusion may consist of a single photon fusion comprising a plurality of polarizing beam splitters, a plurality of wave plates and a plurality of photon detectors. The photon detector may include any one of an on-off detector and a single-photon resolving detector. Each single-photon Hadamard gate may consist of one waveplate.

In one embodiment, configuring the plurality of star clusters comprises: performing a first multi-photon BSM based a first side qubit of the microcluster of type 1 and a second side qubit of any one of the microcluster of type 2; and performing a second multi-photon BSM based on the third side qubit of the microcluster of type 1 and the second side qubit of another one of the microcluster of type 2. Here, the first side qubits and the third side qubits of the microcluster of type 1, and the second side qubits of the microcluster of type 2 are removed through the first multi-photon BSM, and the second multi-photon BSM, and the star cluster may be composed of a central qubit of the microcluster of type 1 and first side qubits and third side qubits of the microclusters of type 2.

In the step for constructing the plurality of star clusters, when two multiphoton qubits are defined as (n, m) parity state coding, it may include a concatenated BSM performing a block-level BSM n times, and single-photon BSM m times for every block-level BSM. In connection with the detailed description of the step for configuring the star clusters, reference may be made to FIGS. 12 and 13 which will be described later.

The step for configuring a Raussendorf-Harrington-Goyal (RHG) lattice by using the plurality of star clusters comprises: performing a third multi-photon BSM with a first side qubit of a first star cluster and a third side qubit of a second star cluster among the plurality of star clusters; and performing a fourth multi-photon BSM with a third side qubit of the first star cluster and a first side qubit of the second star cluster. The first star cluster may be disposed at a center of a corresponding plane constituting the RHG lattice, and the second star cluster may be disposed at a center of a line segment constituting the corresponding plane. The plurality of star clusters may be disposed at the center of each face constituting the RHG lattice and at the center of a line segment constituting each face. Finally, only the central qubits may be remained in the RHG lattice. In connection with a detailed description of the step of constructing the RHG lattice, reference may be made to FIGS. 14A and 14B, which will be described later.

Figure 1B:
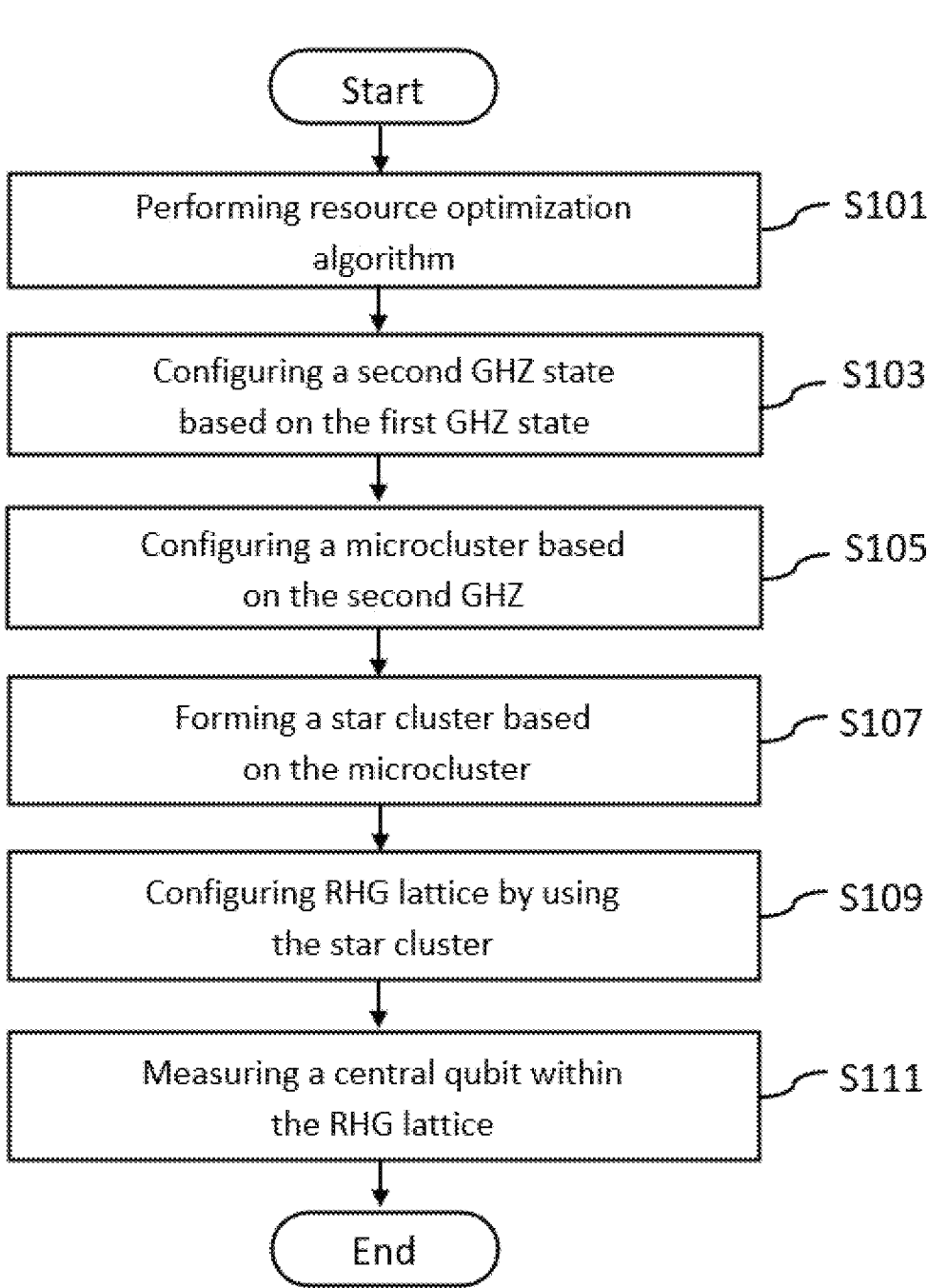

In another embodiment, as shown in FIG. 1A, instead of generating the second GHZ states by combining the first GHZ states and single-photon BSM, and then, generating the microcluster of type 1 and type 2 of HIC and HIS by combining the first GHZ states and the second GHZ states by using single-photon fusion, the microcluster of type 1 and the microcluster of type 2 of HIC and HIS may be directly generated as shown in FIG. 1B by combining the first GHZ states with single-photon fusion and single-photon BSM.

FIG. 1B is a flowchart illustrating a method for linear optical quantum computing according to another embodiment of the present invention.

Referring to FIG. 1B, the method for linear optical quantum computing may comprise: a step S101 for determining a sequence of a single photon fusion and single photon BSM expressed by a shape of the combination graph and a line between the vertices by performing a resource optimization algorithm for a combination graph consisting of a plurality of vertices representing the microcluster and lines connecting the vertices; a step S103 for configuring at least two first GHZ states consisting of three photons based on the shape of the combination graph; a step S105 for generating at least one microcluster of type 1 including a specific entangled state consisting of three multiphoton qubits defined by (n, m) parity-state encoding for two side qubits and (l, k) parity-state encoding for one central qubit, and at least two or more microcluster of type 2 comprising a specific entangled state consisting of three multiphoton qubits defined by (n, m) parity state coding for three side qubits, based on the first GHZ states and the sequence of the single photon fusion and single photon BSMs between the first GHZ states; a step S107 for configuring a plurality of star clusters composed of four side qubits around the central qubit by thirdly combining the at least one microcluster of type 1 and the at least two microclusters of type 2; a step S109 for configuring an RHG lattice by using the plurality of star clusters; and a step S111 for measuring at least one central qubit of the RHG lattice.

In connection with a description about the shape of the combination graph and the resource optimization algorithm for determining the order of single-photon fusion and single-photon BSMs indicated by a line between the vertices, reference may be made to the description of FIG. 1C, which will be described later. The step S103 of configuring at least two first GHZ states made of the three photons may refer to the description of step S102 of FIG. 1A unless the there are no contradictions between both descriptions. In addition, the description of steps S107 to S111 of FIG. 1B may refer to the description of steps S106 and S110 of FIG. 1A as long as there is no contradiction.

FIG. 1A is a diagram illustrating a structure wherein the GHZ-N states are connected through multi-photon fusion to form a microcluster after generating a GHZ-N state through single-photon BSM. FIG. 1B is a diagram illustrating a format of a combination graph illustrating the microcluster determined based on the resource optimization algorithm, and a structure wherein the microcluster may be formed through the sequence of single-photon fusion and single-photon BSMs represented by lines between vertices constituting the combination graph.

FIG. 1C is a diagram illustrating a resource optimization method using a combination graph according to an embodiment of the present invention.

Referring to FIG. 1C, one may be arbitrarily selected from at least one possible combination graph representing the corresponding microcluster (step S200). A variable $M_v$ is defined for each vertex v of the selected combination graph (step S202). Initialization is performed as $M_v=1$. $M_v$ is defined as the 'cost' of v.

$$M_e = \frac{2}{(1-\eta)^2}(M_{v_1} + M_{v_2})$$

Then, in step S204, this equation, is defined for each line (e) of the combination graph. Here, $\eta$ is the photon loss rate, $v_1$ and $v_2$ is the two vertices connected by e. $M_e$ may be defined as the cost of e.

In step S206, it is determined whether the combined graph has one vertex, and steps S208 to S224 may be repeated until the combined graph has one vertex. When one vertex appears in the combined graph, the resource optimization method may be terminated.

In step S208, a set of lines ($E_{min\text{-}wgt}$) having the smallest cost is searched for. There may be several lines which minimize cost, and $E_{min\text{-}wgt}$ may include all lines which minimize cost.

In step S210, a color is given to the lines of the combined graph. In this case, the lines sharing the vertices have different colors, and the number of types of colors should be as few as possible. As a method of assigning colors to the lines of the combined graph, a conventionally known 'graph edge coloring algorithm' may be used.

In step S212, $E_{min\text{-}wgt}$ be divided into several groups according to the color. Choose the largest group $E_{mrg}$ among them. If the largest group is not unique, you may choose arbitrarily $E_{mrg}$ among them.

In step S218, it is determined whether the line is included in the group to perform steps S220 to S224 for each line (e) of $E_{mrg}$ If the line, (e) is not included in the group, you may proceed to step B.

In step S220, two vertices $v_1$, $v_2$ connected by a line (e) are combined into one vertex $v_e$. In this case, all lines connected to $v_1$, $v_2$ may be connected to $v_e$. In this process, several lines may be connected to the same two vertices or may be created as a form of a loop connected to one vertex. Thereafter, in step S222, the cost ($M_{v_e}$) of $v_e$ may be initialized to be equal to the cost ($M_e$) of e.

After that, in step S224, when the cost of the case where e' is connected to two different vertices $v_1$ and $v_2$ for each line (e') connected to $v_e$, the cost of e' is calculated as $$M_{e'} = \frac{2}{(1-\eta)^2}\left(M_{v_1} + M_{v_2}\right).$$

Alternatively, if e' is a form of a ring connected to one vertex $v_1$, the cost of e' is calculated as $$M_{e'} = \frac{2}{(1-\eta)^2} M_{v_1}.$$

The cost of one vertex remaining in the finally coupled graph through the above-described steps S200 to S224 may be the same as the average number of GHZ-3 states required to make the corresponding microcluster. That is, the combination graph for the microcluster may be determined in step S200, and the order of single-photon BSM and single-photon fusion may be determined in steps S220 to S224. Each line in the combination graph corresponds to one single photon BSM or single photon fusion, and the average number of GHZ-3s required to construct a microcluster may be optimized by repeating steps S208 to S22.

Figures 2A, 2B:
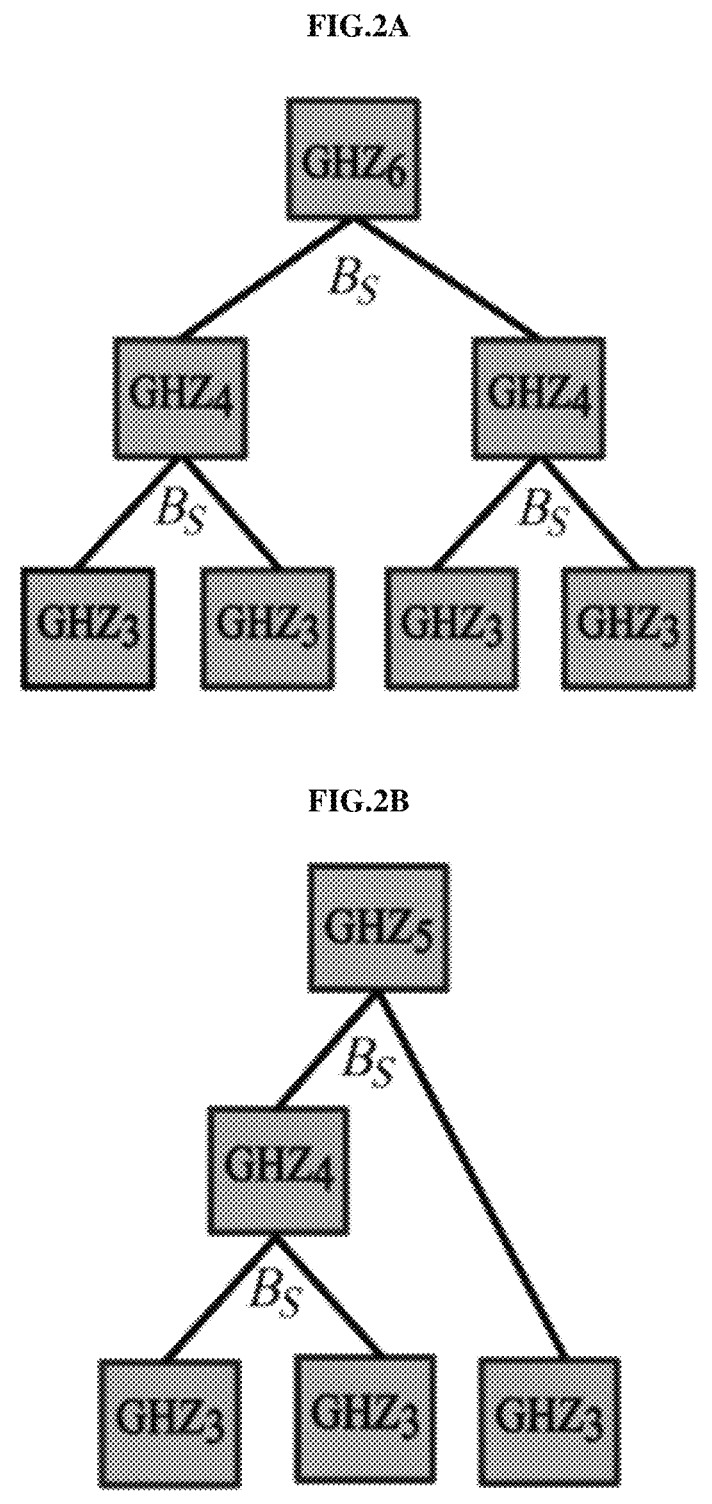

FIG. 2A and FIG. 2B are diagrams illustrating an example configuring a second GHZ state consisting of N photons by using a first GHZ (Greenberger-Horne-Zeilinger) state consisting of three photons in an embodiment of the present invention.

Referring to FIG. 2A, as four first GHZ states (GHZ$_3$) consisting of three photons are combined (B$_s$) two by two based on single-photon BSM, two second GHZ states (GHZ$_4$) composed of four photons may be configured. Furthermore, as two second GHZ states (GHZ$_4$) are combined (B$_s$) based on single-photon BSM, second GHZ state (GHZ$_6$) composed of six photons may be configured.

Referring to FIG. 2B, two of the three first GHZ states (GHZ$_3$) consisting of three photons are combined (B$_s$) based on single-photon BSM so that one second GHZ state (GHZ 4) consisting of four photons may be configured. Again, one first GHZ states (GHZ$_3$) of three first GHZ states (GHZ$_3$), and the second GHZ state (GHZ$_4$) is combined (B$_s$) based on single-photon BSM so that one second GHZ state (GHZ$_5$) consisting of five photons may be configured.

Figure 3:
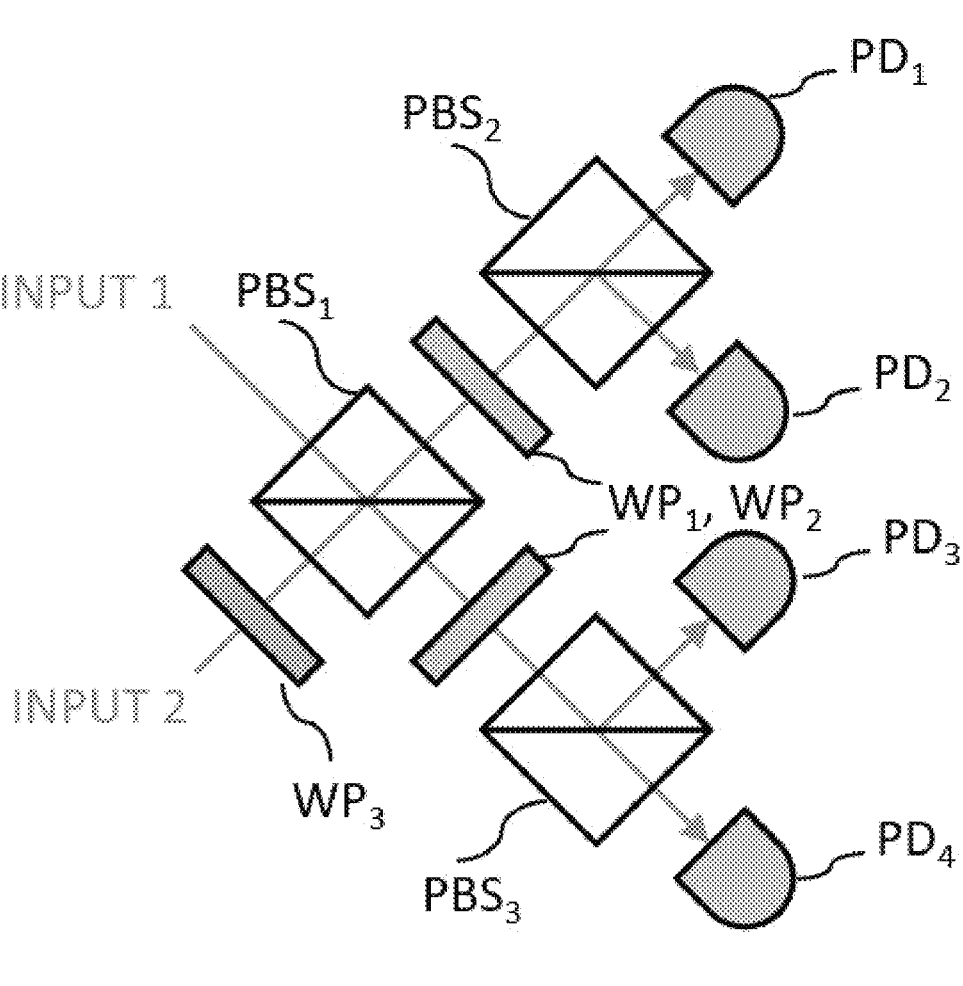
FIG. 3 is a block diagram of a single-photon BSM (Bell-state measurement) according to an embodiment of the present invention.

FIG. 3 is a configuration diagram of single-photon BSM (Bell-state measurement) for a case when a single-photon polarization coding based on a single-photon state which is polarized horizontally or vertically with single-photon qubits according to an embodiment of the present invention. It is possible to distinguish between the state $|\Psi_+\rangle$ and the state $|\Psi_-\rangle$ among the four bell states.

Referring to FIG. 3, the single photon BSM 30 may be composed of three polarizing beam splitters (PBS$_1$ to PBS$_3$), three wave plates (WP$_1$ to WP$_3$) and four photon detectors (PD$_1$ to PD$_4$). Two of the three waveplates (WP$_1$ and WP$_2$) may provide and output a 45° phase difference with respect to the input light, and the waveplate (WP$_3$) may provide and output a 90° phase difference with respect to the input light. The photon detectors (PD$_1$ to PD$_4$) may include any one of an on-off detector and a single-photon resolving detector. The on-off detector may determine only the presence or absence of a photon, and the one-photon discrimination photon detector may discriminately determine a case that there is no photon, a case that a photon has one photon, and a case that there are two or more photons. The bell state which may be distinguished adding or removing a waveplate in front of PBS$_1$ may be changed. Specifically, if WP$_3$ is removed in FIG. 3, the state $|\Phi_+\rangle$ and the state $|\Psi_+\rangle$ may be distinguished. In FIG. 3, one 45° phase difference wave plate is disposed between PBS$_1$ and INPUT 1 and between PBS$_1$ and WPS$_3$, respectively, the state $|\Phi_+\rangle$ and the state $|\Psi_+\rangle$ may be distinguished. If PBS$_1$ is removed in this state, it is possible to distinguish the state $|\Phi_+\rangle$ and the state $|\Psi_+\rangle$. On the other hand, the single-photon Hadamard gate may be composed of one wave plate which provides and outputs a 45° phase difference with respect to the input light.

Figure 4:
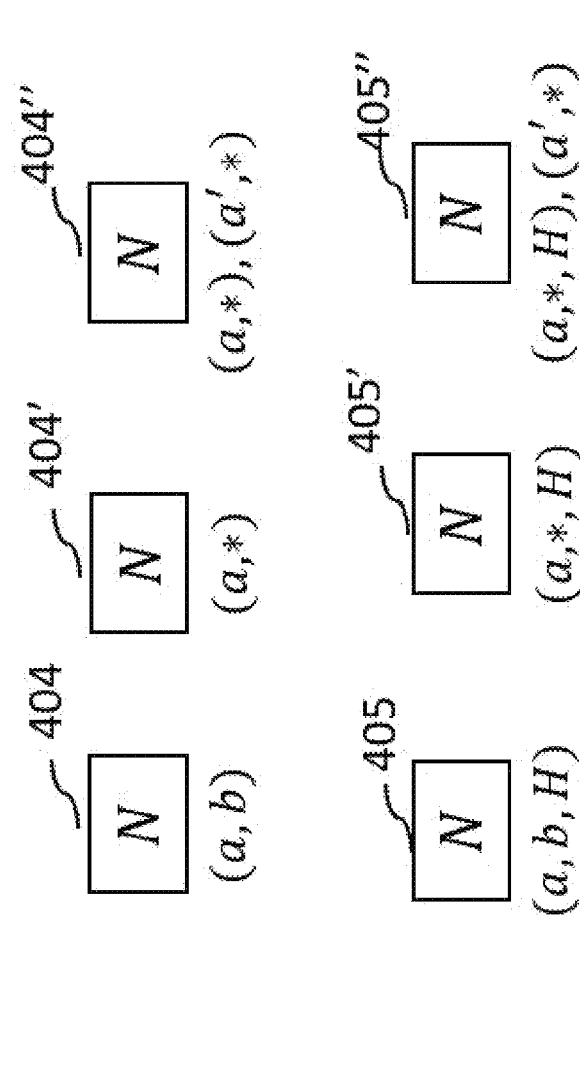
FIG. 4 shows symbols of a graph constituting a microcluster of type 1 and a microcluster of type 2 according to an embodiment of the present invention.
Figure 4:
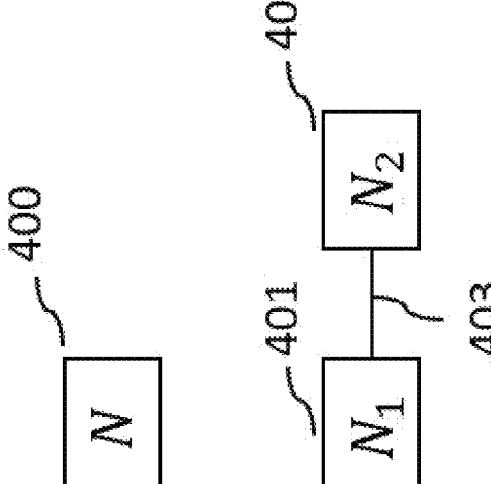

FIG. 4 shows the symbols of a graph for a method for constructing a microcluster of type 1 and a microcluster of type 2 by combining the GHZ states in an embodiment of the present invention.

Referring to FIG. 4, the rectangle 400 on which the number N is written means the GHZ-N state. The GHZ-N state means a GHZ state consisting of N photons. The two rectangles 401 and 402 connected by a line 403 mean that single-photon fusion is performed by randomly selecting one photon in each of the GHZ-N$_1$ state and the GHZ-N$_2$ state. Similarly, when several lines are connected to one square, a single-photon fusion may be performed one by one, and the photons on which single-photon fusion has been performed may be removed without remaining ones.

An ordered pair (a, b) below or next to the square 404 means that the remaining photons after single-photon fusion in the corresponding GHZ state constitute the b-th block of the a-th multiphoton qubit in the microcluster. 'a' is the multiphoton qubit index and 'b' is the block index. If the second number in the square 404' is the symbol '*', it means that the remaining photons constitute all blocks of the a-th multiphoton qubit. If there are multiple ordered pairs (a, *), (a', *) in the rectangle 404", it means that the remaining photons constitute all blocks corresponding to the ordered pair. And if all the photons of the corresponding GHZ states are used for fusion, the number is not written down. In the squares 405, 405', 405", the symbol 'H' in an ordered pair means that a single-photon Hadamard gate is applied to the remaining photons corresponding to the ordered pair.

FIG. 5A to FIG. 5D are diagrams illustrating a process for generating a microcluster of type 1 according to an embodiment of the present invention.

Referring to FIG. 5A, when m>1 and k>1, the first H-configuration (HIC) of the microcluster of type 1, that is, the first H-configuration (HIC) defined by [Equation 5] may be represented in a schematic diagram as shown in FIG. 5A.

Referring to FIG. 5B, when m=k=1, the first H-configuration (HIC) of the microcluster of type 1, that is, the first H-configuration (HIC) defined by [Equation 5] may be represented as a schematic diagram as shown in FIG. 5B.

Referring to FIG. 5C, when m>1 and k=1, the first H-configuration (HIC) of the microcluster of type 1, that is, the first H-configuration (HIC) defined by [Equation 5] may be represented in a schematic diagram as shown in FIG. 5C.

Figure 5D:
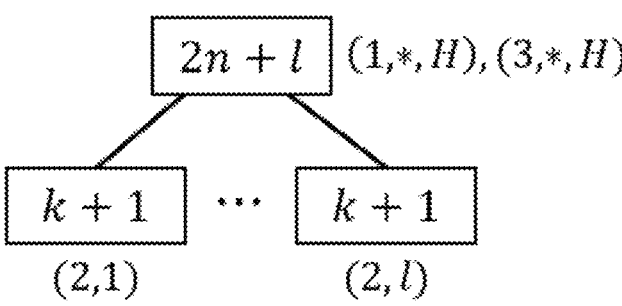

Referring to FIG. 5D, when m=1 and k>1, the first H-configuration (HIC) of the microcluster of type 1, that is, the first H-configuration (HIC) defined by Equation 5 may be represented in a schematic diagram as shown in FIG. 5D.

FIG. 6A to FIG. 6D are diagrams illustrating a process for generating a microcluster of type 2 according to an embodiment of the present invention.

Figure 6A:
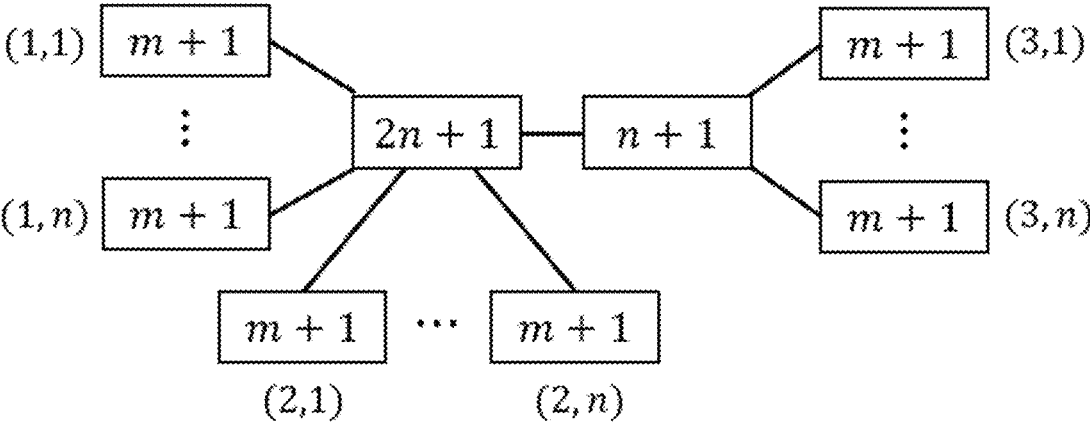

Referring to FIG. 6A, when n>1 and m>1, the first H-configuration (HIC) of the microcluster of type 2, that is, the first H-configuration (HIC) defined by [Equation 7] may be represented in a schematic diagram as shown in FIG. 6A.

Figure 6B:
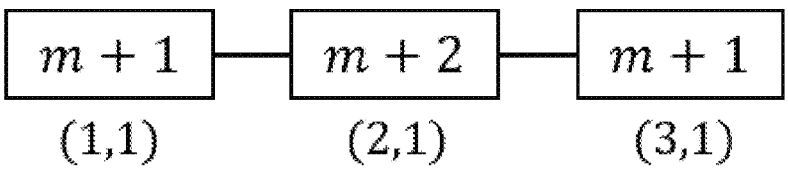

Referring to FIG. 6B, when n=1 and m>1, the first H-configuration (HIC) of the microcluster of type 2, that is, the first H-configuration (HIC) defined by [Equation 7] may be represented in a schematic diagram as shown in FIG. 6B.

Referring to FIG. 6C, when n>1 and m=1, the first H-configuration (HIC) of the microcluster of type 2, that is, the first H-configuration (HIC) defined by [Equation 7] may be represented in a schematic diagram as shown in FIG. 6c.

Referring to FIG. 6D, in the case of n=1 and m=1, the first H-configuration (HIC) of the microcluster of type 2, that is, the first H-configuration (HIC) defined by [Equation 7] may be represented in a schematic diagram as shown in FIG. 6D.

FIG. 7A to 7F are diagrams illustrating a process for generating a microcluster of type 1 according to another embodiment of the present invention.

Referring to FIG. 7A, in the case of n>1, m>1, and k>1, the second H-configuration (HIS) of the microcluster of type 1, that is, the second H-configuration (HIS) may be represented in a schematic diagram as shown in FIG. 7A.

Referring to FIG. 7B, when n=1 and k>1, the second H-configuration (HIS) of the microcluster of type 1, that is, the second H-configuration (HIS) defined by [Equation 6] may be represented in a schematic diagram as shown in FIG. 7B.

Referring to FIG. 7C, in the case of m=n=1, the second H-configuration (HIS) of the microcluster of type 1, that is, the second H-configuration (HIS) defined by [Equation 6] may be represented in a schematic diagram as in FIG. 7C.

Referring to FIG. 7D, when n>1, m=1, and k>1, the second H-configuration (HIS) of the microcluster of type 1, that is, the second H- The configuration (HIS) may be represented in a schematic diagram as shown in FIG. 7D.

Figure 7E:
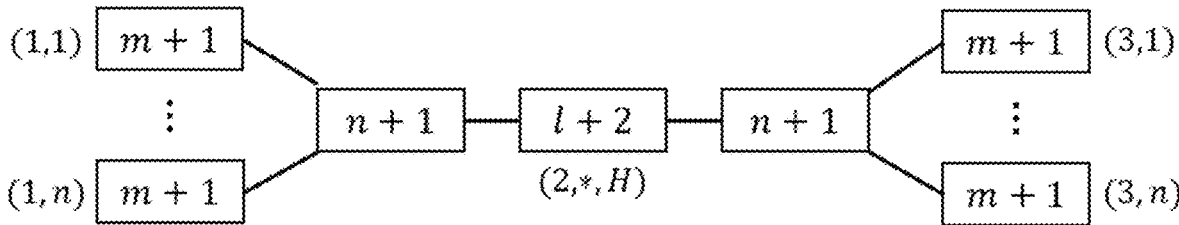

Referring to FIG. 7E, in the case of n>1, m>1, and k=1, the second H-configuration (HIS) of the microcluster of type 2, that is, the second configuration (HIS) may be represented in a schematic diagram as shown in FIG. 7E.

Figure 7F:
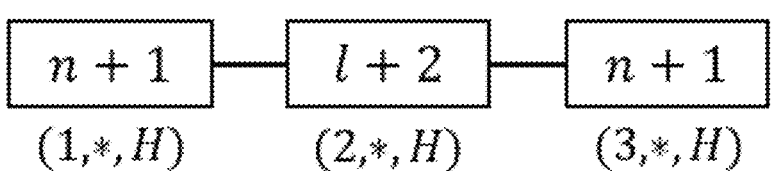

Referring to FIG. 7F, when n>1 and m=k=1, the second H-configuration (HIS) of the microcluster of type 1, that is, the second H-configuration (HIS) defined by [Equation 6] may be represented in a schematic diagram as shown in FIG. 7F.

FIG. 8A to FIG. 8D are diagrams illustrating a process for generating a microcluster of type 2 according to another embodiment of the present invention.

Figure 8A:
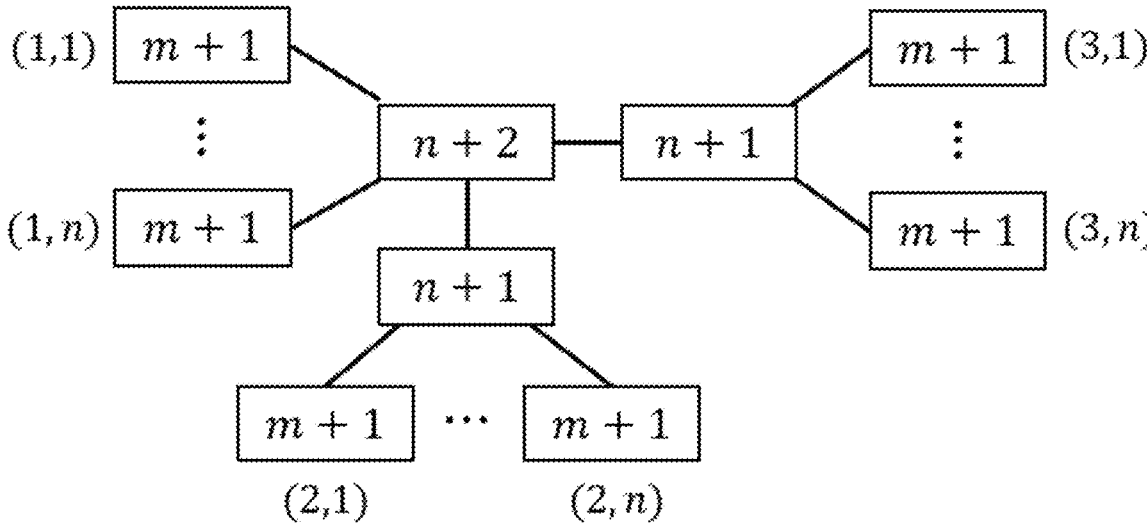

Referring to FIG. 8A, when n, m>1, the second H-configuration (HIS) of the microcluster of type 2, that is, the second H-configuration (HIS) defined by [Equation 8] may be represented as a schematic diagram as in FIG. 8A.

Figures 8B, 8C, 8D:
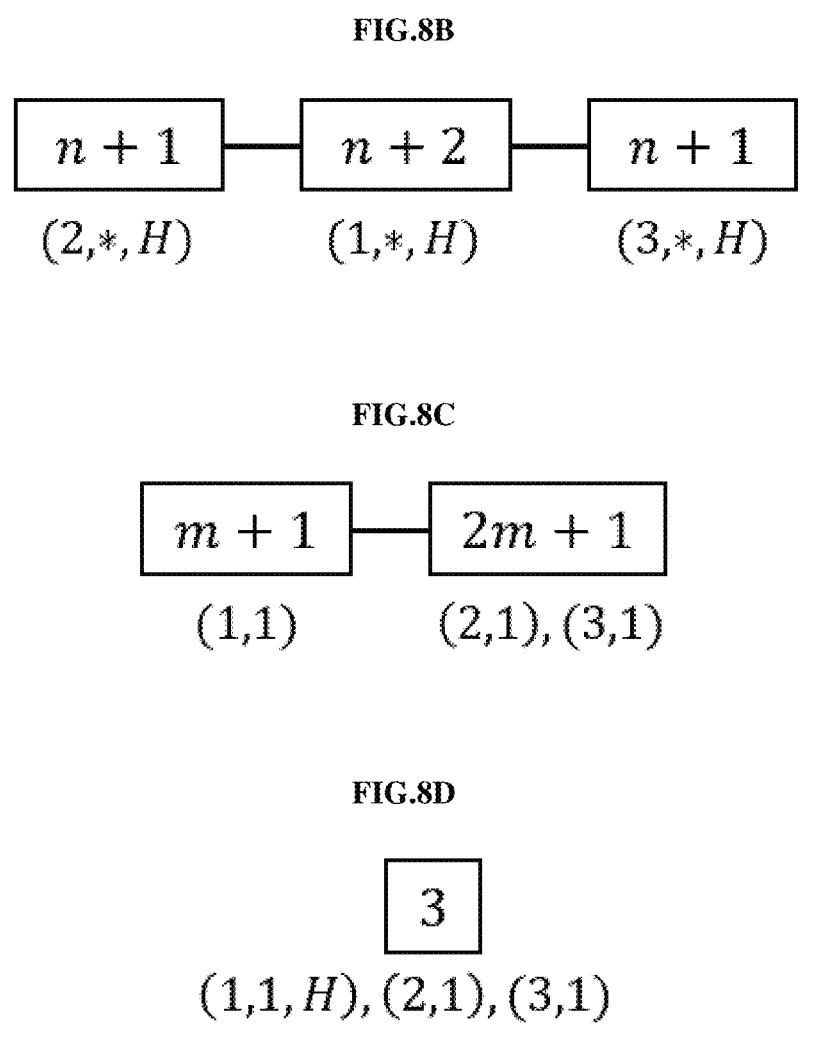

Referring to FIG. 8B, when n>1 and m=1, the second H-configuration (HIS) of the microcluster of type 2, that is, the second H-configuration (HIS) defined by [Equation 8] above may be represented in a schematic diagram as shown in FIG. 8B.

Referring to FIG. 8C, when n=1 and m>1, the second H-configuration (HIS) of the microcluster of type 2, that is, the second H-configuration (HIS) defined by [Equation 8] above may be represented in a schematic diagram as shown in FIG. 8C.

Referring to FIG. 8D, in the case of n=m=1, the second H-configuration (HIS) of the microcluster of type 2, that is, the second H-configuration (HIS) defined by [Equation 8] may be represented in a schematic diagram as in FIG. 8D.

Figure 9A:
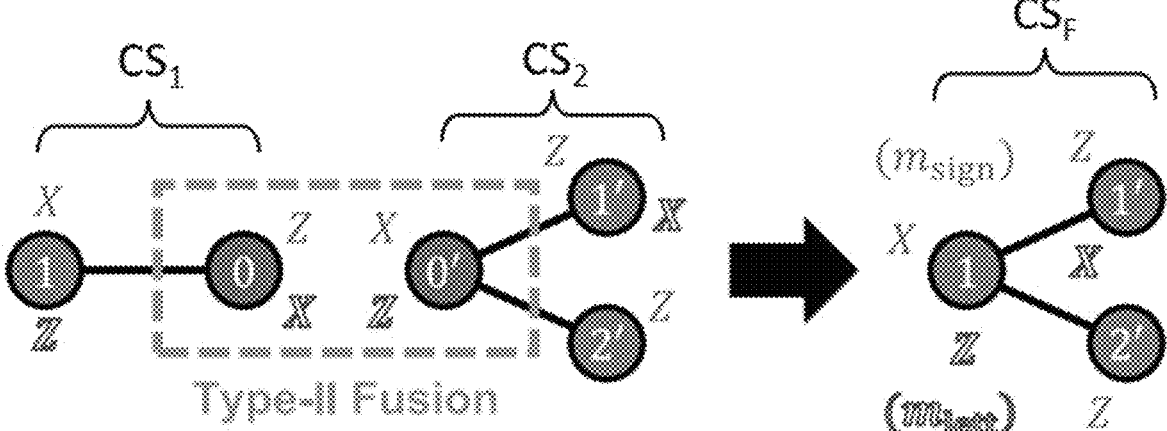
FIG. 9A and FIG. 9B are diagrams illustrating examples of type II fusion according to an embodiment of the present invention.
Figure 9A:
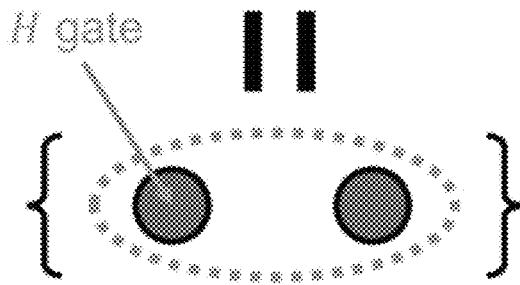
Figure 9B:
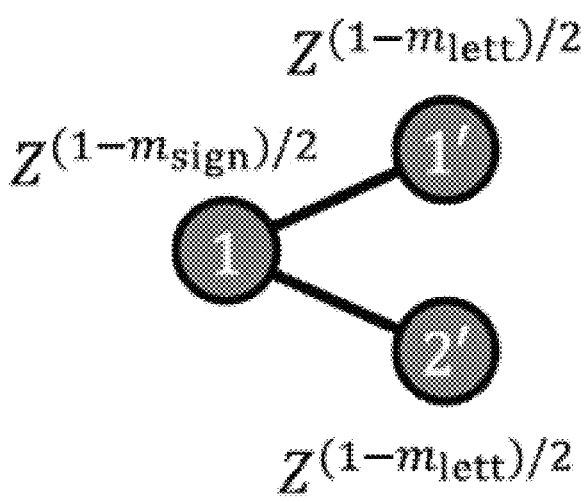

FIG. 9A and FIG. 9B are diagrams illustrating examples of type II fusion according to an embodiment of the present invention.

Referring to FIG. 9A, an example of type II fusion (an orange box) performed by measuring $Z_0X_0'$ and $X_0Z_0'$ in two cluster states ($CS_1$, $CS_2$) is illustrated. Each of the two cluster states ($CS_1$, $CS_2$) may consist of a plurality of qubits (indicated by a circle). Each of the two cluster states ($CS_1$, $CS_2$) may consist of a plurality of qubits (indicated by a circle). Among the stabilizers of $CS_1$, and $CS_2$, two types may be transformed into a form in which the stabilization operator of the final cluster state (CSF) is multiplied by a sign factor determined as a result of the BSM after fusion. As a result, as shown in FIG. 9B, a final cluster state in which a Pauli-Z operator is applied to some qubits may be created.

In the graph G of qubits, the cluster state IG may be defined as a stable state by (i.e., $S_v := X_v \Pi_{v' \in N(v)} Z_{v'}$ (i.e., Sv|G=|G). In other words, Sv|G>=|G> is satisfied. Here, v means each vertex of the graph, that is, each qubit, $X_v$ and $Z_v X_v$ are Pauli-X and Z operators operating on qubit v, respectively, and N(v) is a set of vertex connected to v. The type II fusion (an orange box) may be performed by measuring the $X \otimes Z$ and $Z \otimes X$ of two qubits. One way to implement this is to apply a Hadamard gate to one of the two qubits and then perform BSM on them. The effect of fusion on the qubits are as follows. In connection with all possible ordered pairs made by selecting one from each of $N(v_1)$ and $N(v_2)$, if the two qubits of the corresponding ordered pair are not connected on the graph, they will be connected, and on the contrary, if they are already connected, the connection will be disconnected. However, a quantum state in which the Pauli-Z operator is applied to some qubits in the final cluster state may be obtained according to the result of BSM. This effect may be confirmed by tracking the deformation of the stabilizers, as in the example of FIG. 9A.

The present invention is not limited to type II fusion, which removes two qubits in the input quantum state. For example, it may be replaced with type I fusion, which removes only one qubit in the input quantum state. Preferably, type II fusion may be used in the present invention because type I fusion may translate into an unanticipated error in photon loss among the two types of fusion.

Figure 10:
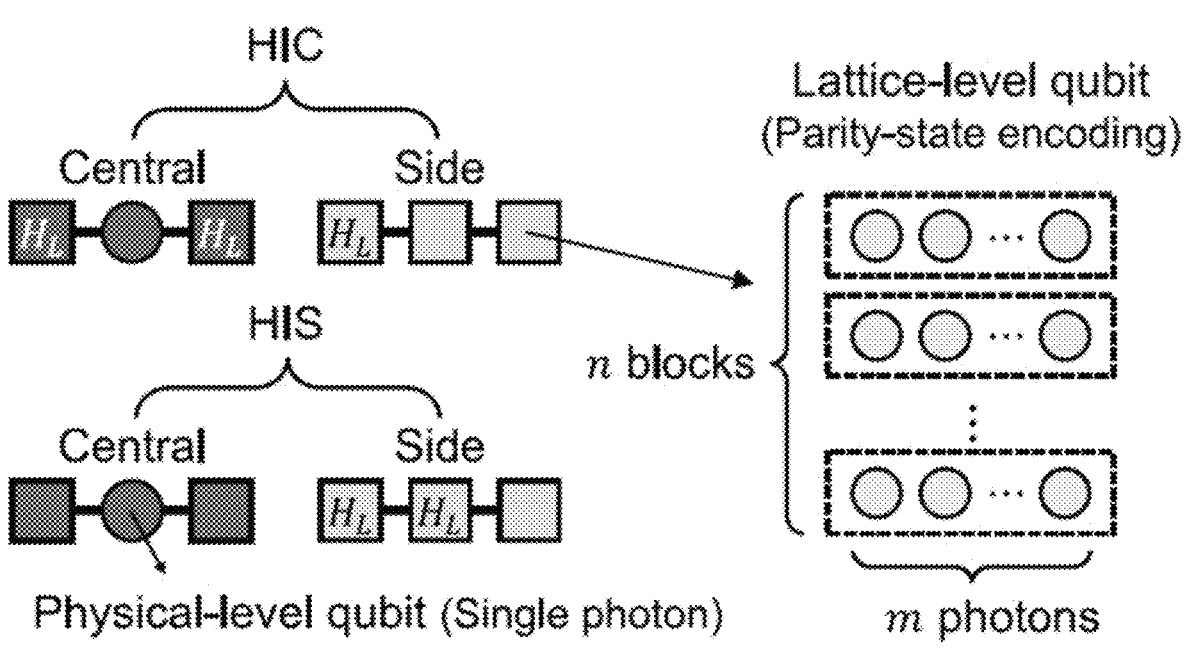
FIG. 10 is a schematic diagram of a microcluster for two H-configurations (HIC and HIS).

FIG. 10 is a schematic diagram of a microcluster for two H-configurations (HIC and HIS) in an embodiment of the present invention.

Referring to FIG. 10, H-configuration (HIC, HIS) may include the microcluster of type 1 Central) composed of one circle qubit in the center and two square box qubits connected to the circle qubit, and the microcluster of type 2 (Side) composed of three-square box qubits connected to each other. Each square box qubit is a lattice-level multiphoton qubit and is defined as (n, m) parity-state encoding. That is, each of the n blocks contains m photons, and a square box qubit contains m×n photons. Each circle qubit may be a qubit at the physical level, i.e., a single photon qubit. In another embodiment, each circle qubit may be a lattice-level qubit, that is, a multiphoton qubit defined by (l, k) parity-state encoding. n, m, l, and k are natural numbers. The marked "$H_L$" in the square box represents the multiphoton Hadamard gate for parity state coding. Specifically, in H-configuration (HIC), a microcluster (Central) of type 1 may be created by applying a multiphoton Hadamard gate to two square box qubits in a cluster state in which one square box qubit, one circle qubit, and one square box qubit are linearly and sequentially connected, and the microcluster of type 2 (Side) may be created by applying a multiphoton Hadamard gate to the first square box qubit in a cluster state in which three square box qubits are linearly connected. In H-configuration (HIS), a microcluster of type 1 may be defined as a cluster state in which one square box qubit, one circle qubit, and one square box qubit are linearly connected in order, and the microcluster of type 2 (Side) may be created by applying a multiphoton Hadamard gate to the first and second square box qubits in a cluster state in which three square box qubits are linearly connected.

In another embodiment, instead of applying a multiphoton Hadamard gate to the aforementioned linear cluster states to create microclusters, the GHZ states is properly combined into single-photon fusion and single-photon BSM as shown in FIG. 1B, so that the microcluster of type 1 and type 2 of HIC and HIS may be directly generated without applying a multiphoton Hadamard gate.

FIG. 11A to FIG. 11F are diagrams illustrating a combination graph of a microcluster of type 1 of HIS when n=3, m=1, l=3, k=2 in an embodiment corresponding to FIG. 1B of the present invention.

FIG. 11A to FIG. 11F are diagrams illustrating a combination graph of a microcluster of type 1 of HIS when n=3, m=1, l=3, k=2 in an embodiment corresponding to FIG. 1B of the present invention.

The combination graph shown in FIGS. 11A to 11F is diagrams illustrating a process that the steps S102 and S104 of FIG. 1A are merged into one step and the merged step proceeds to the step S105 of FIG. 1B during the process of generating a microcluster. This may be utilized to optimize the cost of generating the microcluster. In order to generate a combination graph of a specific microcluster, it is first started with a corresponding figure of FIGS. 5A to 8D. Repeat the following process for all squares with numbers 4 or higher in FIGS. 5A to 8D. First, when the number of the corresponding square is N, the square in which N is written is replaced with N−2 squares in which 3 is written, and the N−2 squares are connected to each other with a dotted line, and the solid lines connected to the existing square in which N is written may be distributed as N−2 squares in which 3 is written. In this case, the distribution method must satisfy the condition that "the number of lines connected to each new rectangle becomes three or less than the total number of the dotted line and the solid line". A square described with 3 indicates one GHZ-3 status.

Figure 11A:
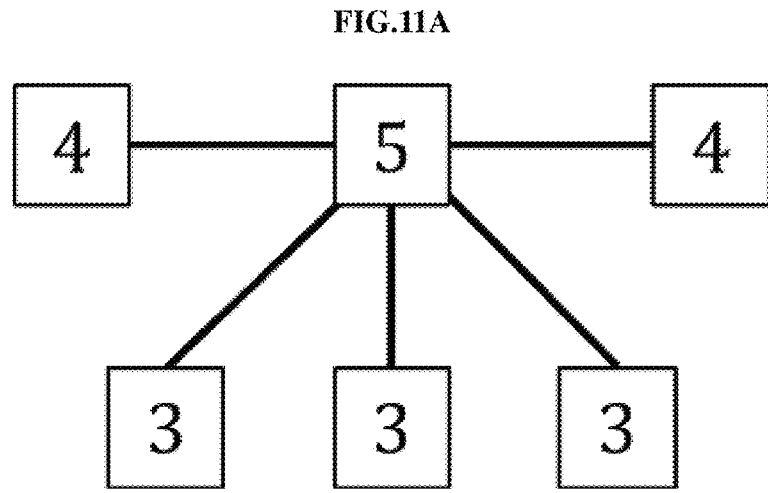
FIG. 11A to FIG. 11F are diagrams illustrating a combination graph of a microcluster of type 1 of HIS according to an embodiment of the present invention.
Figure 11B:
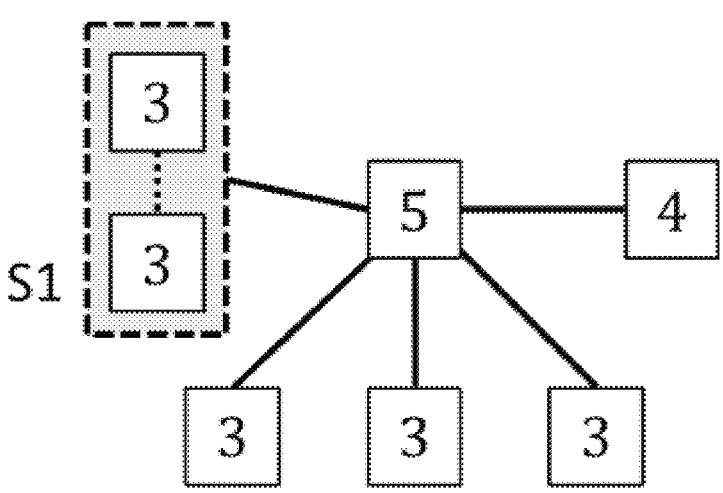
Figure 11C:
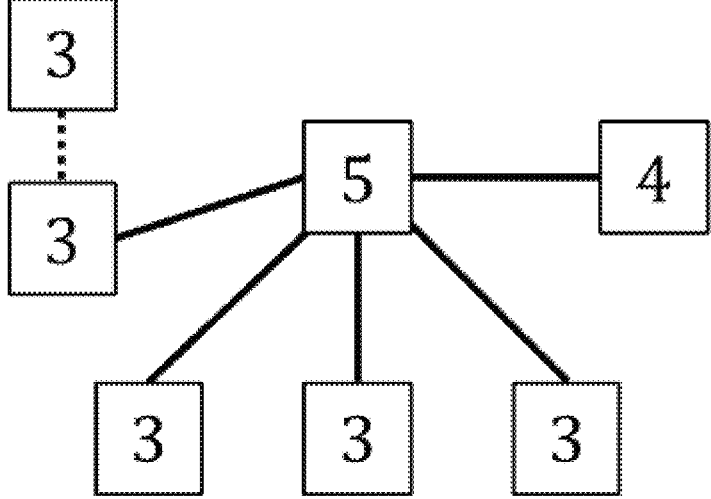
Figure 11D:
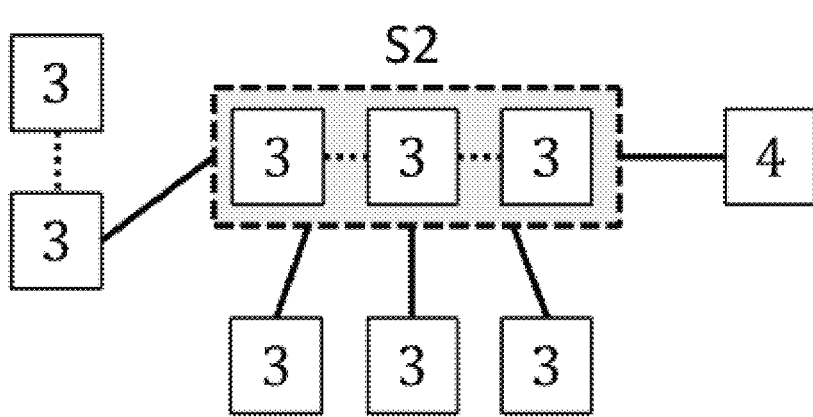
Figure 11E:
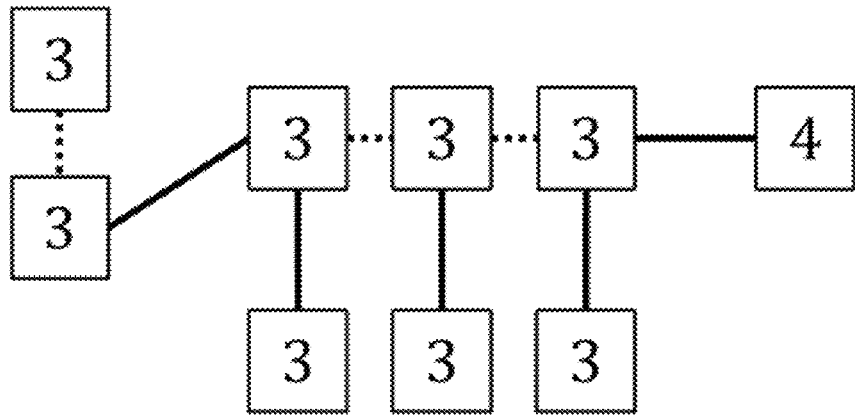

FIG. 11A shows the corresponding diagram of diagrams of FIGS. 5A to 8D by taking the microcluster of type 1 of HIS as an example when n=3, m=1, l=3, k=2. Referring to FIGS. 11B and 11C, the leftmost square 4 (N=4) in FIG. 11A may be replaced with two squares S1 (=4−2) in which 3 is written. The two GHZ-3 states may be connected by a dotted line, and solid lines may be distributed to the two GHZ-3 states. Since there is one solid line connected to the GHZ-4 state in FIG. 11A, the solid line in FIG. 11C may be connected to any one of the two GHZ-3 states. Also, referring to FIGS. 11D and 11E, the square with 5 in the center may be replaced with three squares S2 (=5-2) with three numbers in FIG. 11C. The three GHZ-3 states are connected by a dotted line, and the three solid lines may be distributed to the three GHZ-3 states. Since there are five solid lines connected to the GHZ-5 state in FIG. 11C, each of the solid lines in FIG. 11E may be connected to any one of the three decomposed GHZ-3 states as long as the conditions for the distribution method are satisfied. Similarly, a quadrangle with 4 (N=4) on the rightmost side in FIG. 11E may be disassembled and connected in the same manner as in FIGS. 11B and 11C. Through the above process, the combination graph of FIG. 11F may be generated. In the present invention, the combination graph is only an example, and several types of combination graphs may be generated for the same microcluster.

Figure 11F:
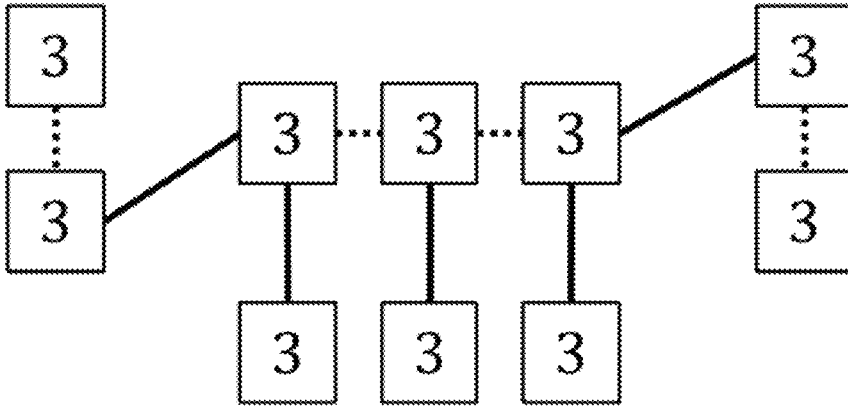

Finally, a GHZ-3 state for each box in the generated combined graph may be prepared as shown in FIG. 11F, and one photon from the two GHZ-3 states connected to each solid line is selected, and a single-photon fusion is performed, and a microcluster may be created by selecting one photon from the two GHZ-3 states connected to each dotted line and performing single-photon BSM. In this case, the time order of single-photon BSMs and single-photon fusions is independent of the shape of the final microcluster, but may be determined through the method of FIG. 1C described above for resource optimization.

The physical meaning of the above-described combination graph generation process 1 (the process in which the square in which N is written is replaced with N−2 squares in which 3 is written) means that a GHZ-N state may be created by combining N−2 GHZ-3 states. That is, if single-photon BSM is performed on N−2 GHZ-3 states along the dotted lines in process 2(the process of connecting N−2 squares with dotted lines), a GHZ-N state may be generated. Process 3(that is, the process for distributing the solid lines connected to the existing square to N−2 new squares) is considered as a process wherein single-photon fusions which originally occurred between GHZ-N states are realized among multiple GHZ-3 states. The condition of I<the lines connected to each new square must be the total number 3 including the dotted line and the solid lines, or less than 3> is due to the fact that the GHZ-3 state may participate in single-photon fusion/BSM up to three times because the GHZ-3 state consists of three photons.

Figure 12:
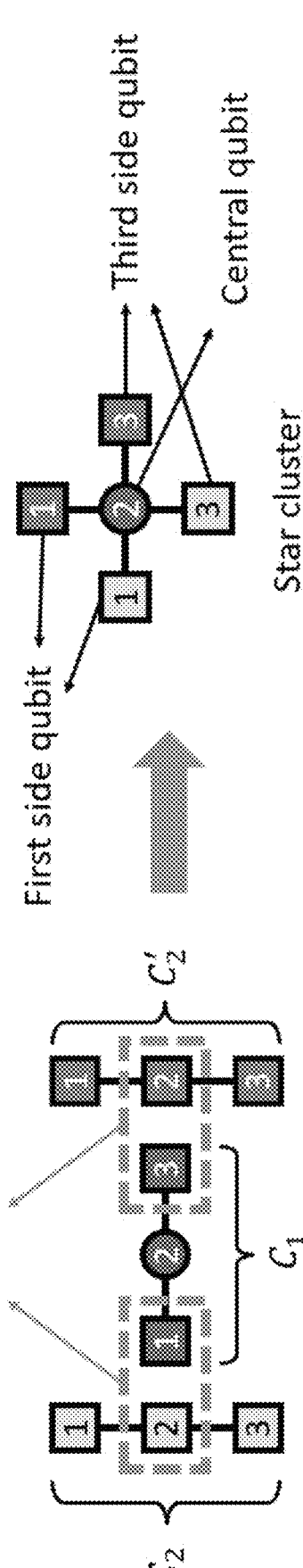
FIG. 12 is a diagram configuring a star cluster by using a microcluster according to an embodiment of the present invention.

FIG. 12 is a diagram configuring a star cluster by using a microcluster according to an embodiment of the present invention.

Referring to FIG. 12, a circle indicates a multiphoton qubit used as a central qubit of a star cluster, and a square box indicates a multiphoton qubit used as a side qubit of the star cluster. In addition, the numbers 1, 2, and 3 of the circle and the square box denote the identification numbers for the three multiphoton qubits defined by the parity state encoding described above.

First of all, one microcluster $(C_1)$ of type 1 and two microclusters $(C_2, C_2')$ of type 2 to constitute a star cluster are selected. The microcluster $(C_1)$ of type 1 is a microcluster generated based on Equation 5 or Equation 6, and may consist of one central qubit (circle '2') and two side qubits (square box '1' and square box '3'). The microclusters $(C_2, C_3)$ of type 2 are microclusters generated based on [Equation 7] or [Equation 8], respectively, and may consist of three side qubits (square boxes '1', '2' and '3').

Next, a multiphoton BSM is applied to the first multiphoton qubit (square box '1') of the microcluster $(C_1)$ of type 1 and the second multiphoton qubit (square box '2') of the microcluster $(C_2)$ of type 2, and a multiphoton BSM is applied to the third multiphoton qubit (square box '3') of the microcluster $(C_1)$ of type 1 and the second multiphoton qubit (square box '2') of the microcluster $(C_2)$ of type 2. As a result, the first multiphoton qubit (square box '1') of the microcluster $(C_1)$ of type 1 and the second multiphoton qubit (square box '2'), the second multiphoton qubit of the microcluster of type 2 $(C_2)$, the third multiphoton qubit (square box '3') of the microcluster $(C_1)$ of type 1 and the second multiphoton qubit (square box '2') of the microcluster $(C_2)$ of type 2 are removed. Then, the second multiphoton qubit (circle '2') of the microcluster $(C_1)$ of type 1, the first and third multiphoton qubits (the square boxes '1' and '3') of the microcluster $(C_2)$ of type 2, and the first and third multiphoton qubits (square boxes '1' and '3') of the microcluster $(C_2')$ of type 2 remain. Accordingly, the remaining multiphoton qubits may constitute one star cluster (SC). The multiphoton qubits remaining in the microcluster of type 1 $(C_1)$ may become the central qubits (a circle '2') of the star cluster (SC). Among the multiphoton qubits remaining in each of the microclusters ($C_2$ and $C_2'$) of type 2, those that were originally the first multiphoton qubits (square box '1') are called one-sided qubits, and the third multiphoton qubits (square box '1') are referred to as one-sided qubits ('3') may be referred to as three-sided qubits.

Figures 13, 14A:
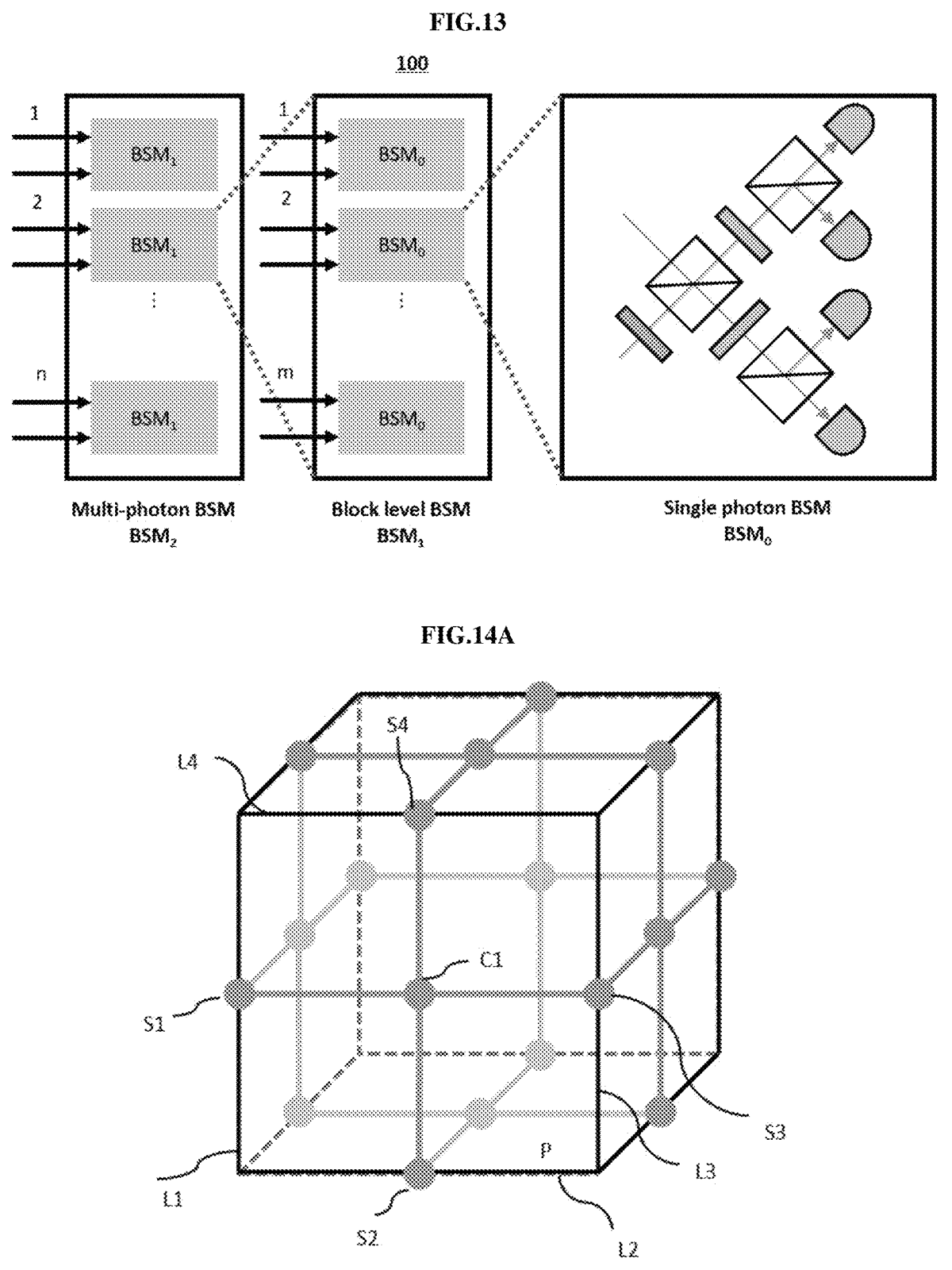

FIG. 13 is a configuration diagram of a multi-photon BSM (Bell-state measurement) according to an embodiment of the present invention.

Referring to FIG. 13, when assuming that two multiphoton qubits are defined by (n,m) parity state encoding, the multiphoton BSM may include a concatenated BSM. The multiphoton BSM 100 may include a second multiphoton BSM ($BSM_2$) which performs $BSM_1$ on n blocks and a first multiphoton BSM ($BSM_1$) which performs $BSM_0$ on m photons in each block. The first multi-photon BSM ($BSM_1$) contains m single-photon BSM (a single-photon BSM in FIG. 3 described above), and the second multi-photon BSM ($BSM_2$) contains n first multi-photon BSM ($BSM_1$). Accordingly, a block-level BSM is performed n times, and each block-level BSM performs single-photon BSM m times.

Figure 14B:
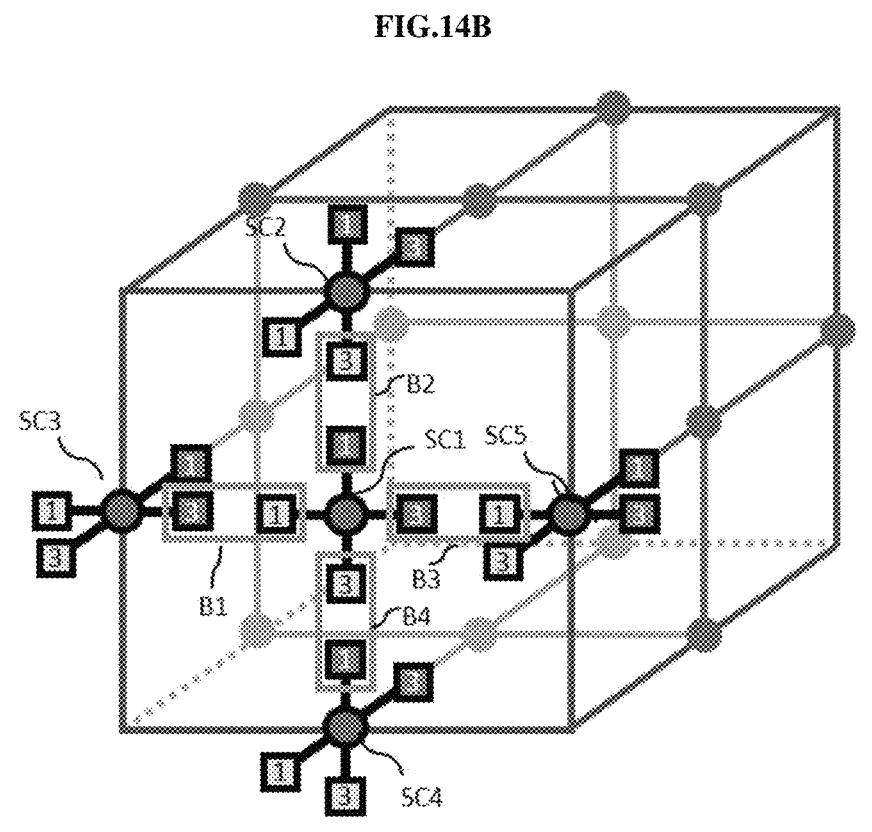

FIG. 14A is a diagram illustrating a Raussendorf-Harrington-Goyal (RHG) lattice according to an embodiment of the present invention, and FIG. 14B is a diagram illustrating configuration of an RHG lattice using star clusters.

Referring to FIG. 14A, the RHG lattice has a three-dimensional structure of a cuboid, and includes one lattice C1 disposed at the center of the plane P for each plane P, and four lattices (S1 to S4) disposed at the center of four line segments (L1-L4) constituting each plane. The lattice S1 may be arranged at the center of the line segment L1, the lattice S2 may be arranged at the center of the line segment L2, the lattice S3 may be arranged at the center of the line segment L3, and the lattice S4 may be arranged at the center of the line segment L4. The arrangement position of the lattice is an example, and the present invention is not limited thereto, and more lattices may be variously defined and disposed on a line segment or a plane. For example, one surface may be divided into a plurality of sub-planes, and lattices may be arranged based on the sub-planes. Alternatively, a plurality of RHG lattices may be grouped to configure one RHG lattice.

Referring to FIG. 14B, the above-described five-star clusters SC may be disposed at lattice positions (C1, S1 to S4) defined in the RHG lattice of FIG. 14A. FIG. 14B shows an example in which five-star clusters SC are disposed. Specifically, the first star clusters SC1 are arranged at the lattice position C1, the second star clusters SC2 are arranged at the lattice position S4, the third star clusters SC3 are arranged at the lattice position S4, the fourth star clusters SC4 may be disposed at the lattice location S2, and the fifth star clusters SC5 may be disposed at the lattice location S3.

In another embodiment, 18 star clusters SC formed at 18 different or identical microclusters in a total of 18 lattice positions included in the RHG lattice of FIG. 14B may be disposed at the above 18 lattice positions. The star clusters to be placed in the RHG lattice may be chosen in consideration of the failure of the multiphoton BSM. Specifically, star clusters to be arranged in the RHG lattice may be selected as the star clusters generated without multiphoton BSMs failure in the star cluster configuration process. In another embodiment, in connection with the star clusters to be placed in the RHG lattice, all star clusters generated regardless of the failure of the multiphoton BSM may be used.

Referring to FIG. 14B, optionally, the corresponding star clusters disposed on each side of the RHG lattice may perform multiphoton BSM for each other. Four multiphoton BSMs may be performed on each side.

Specifically, the multiphoton BSM (B1, B2) is performed based on the two 1-qubits of the first star clusters SC1 and 3-qubits of the second star clusters SC2, and the 3-qubits of the third star clusters SC3. The multiphoton BSM (B3, B4) is performed based on the two 3-qubits of the first star clusters SC1, 1-qubits of the fourth star clusters SC4, and 1-qbits of the fifth star clusters SC5.

Then, two 1-qubits of the first star clusters (SC1), 3-qubits of the second star clusters (SC2), and 3-qubit of the third star clusters may be removed through the multiphoton BSM (B1, B2). Furthermore, two 3-qubits of the first star clusters (SC1), 1-qubit of the fourth star clusters (SC4) and 1-qubit of the fifth star clusters (SC5) may be removed. Finally, only the central qubits (the blue qubits in the figure) may be left in the RHG lattice.

Figure 15A:
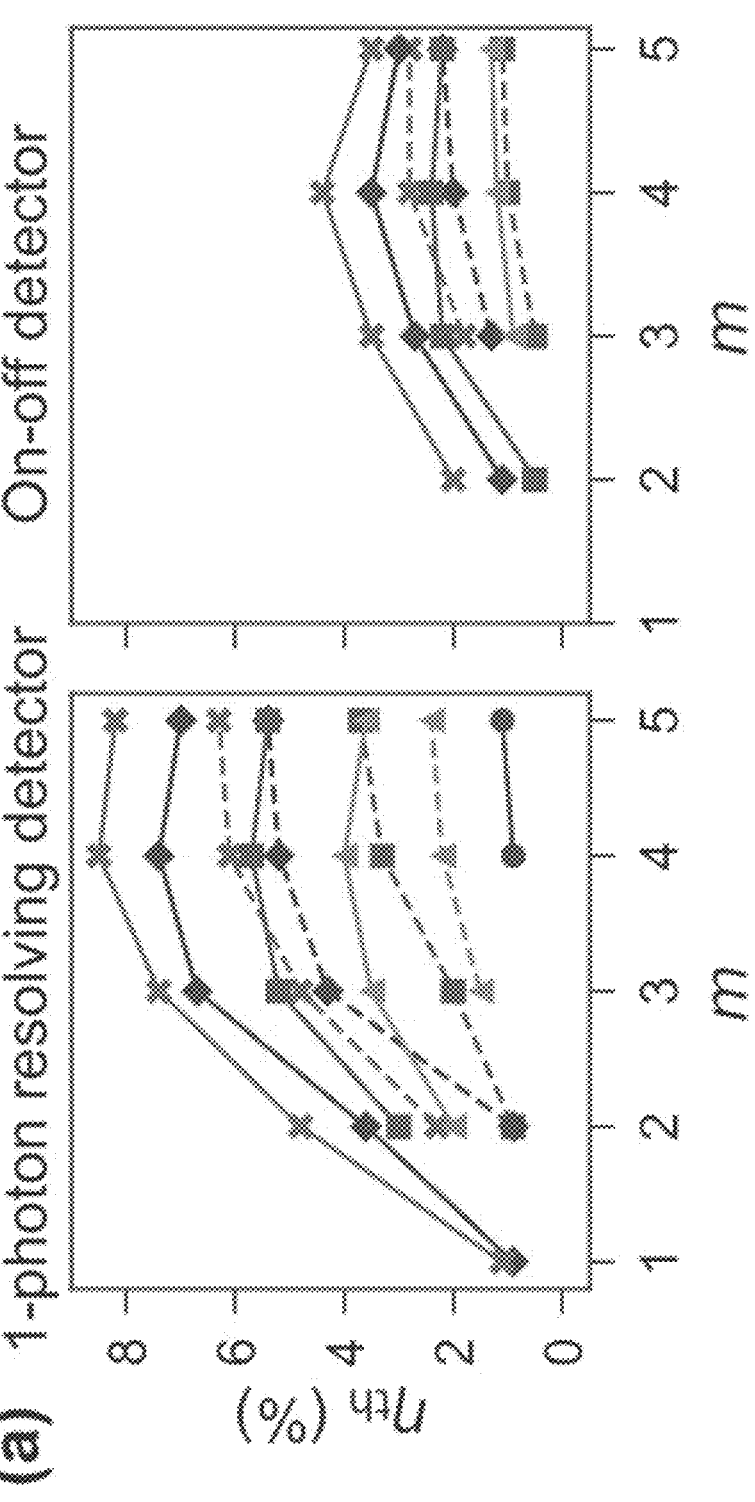
FIG. 15A to FIG. 16B are graphs illustrating the performance of a method for linear optical quantum computing according to an embodiment of the present invention.
Figure 15B:
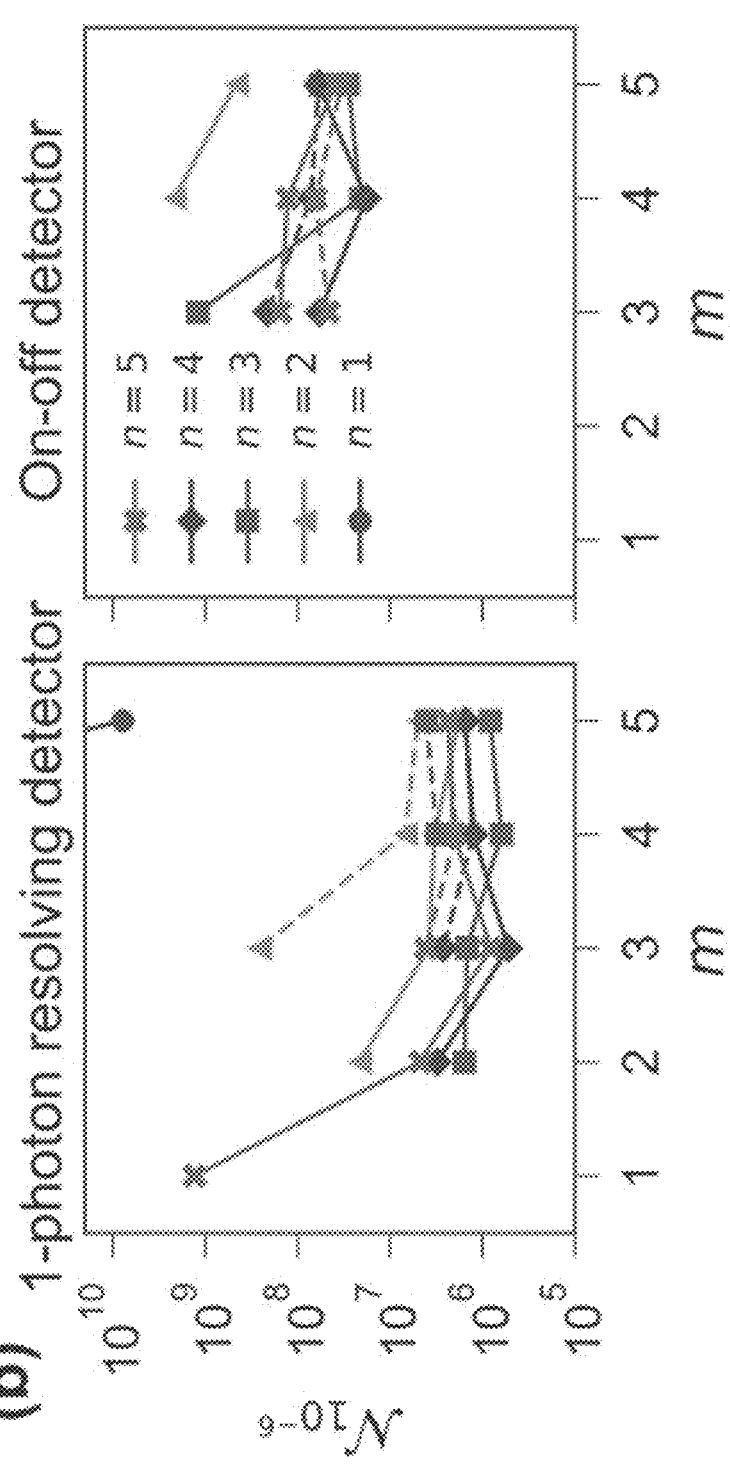

FIG. 15A to FIG. 16B are graphs illustrating performance of a method for linear optical quantum computing according to an embodiment of the present invention. Referring to 15A and 15B, the diagrams show the photon loss threshold ($\eta_{th}$) and resource cost ($N_{10^{-6}}$) according to change of the number (n) of each block and the number (m) of photons in the block, which are observed by using a single-photon resolving detector and an on-off detector when l=k=1, the star cluster is selected. The photon loss threshold ($\eta_{th}$) is the maximum value of the photon loss rate for error correction to be operated normally, and the resource cost ($N_{10^{-6}}$) is the total number of GHZ-3s to achieve a logical error rate of $10^{-6}$ at a photon loss rate of 1%. Referring to FIG. 15A, it may be seen that a photon loss threshold of 8% or less may be achieved when l=k=1, star clusters are selected, and referring to FIG. 15B, it may be seen that, when the star cluster is selected, the resource cost ($N_{10^{-6}}$) of $10^6$ or less is achieved.

Figure 16A:
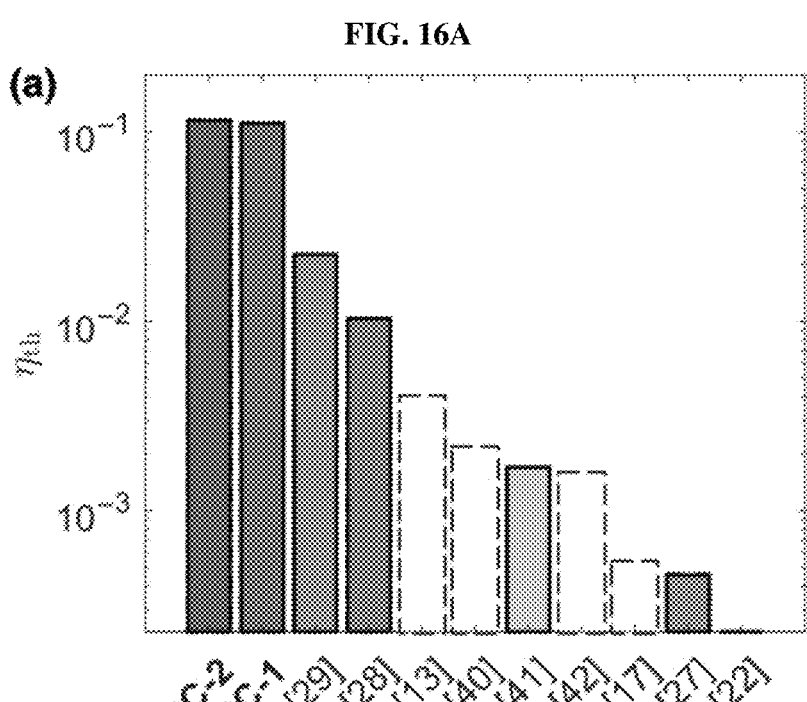
Figure 16B:
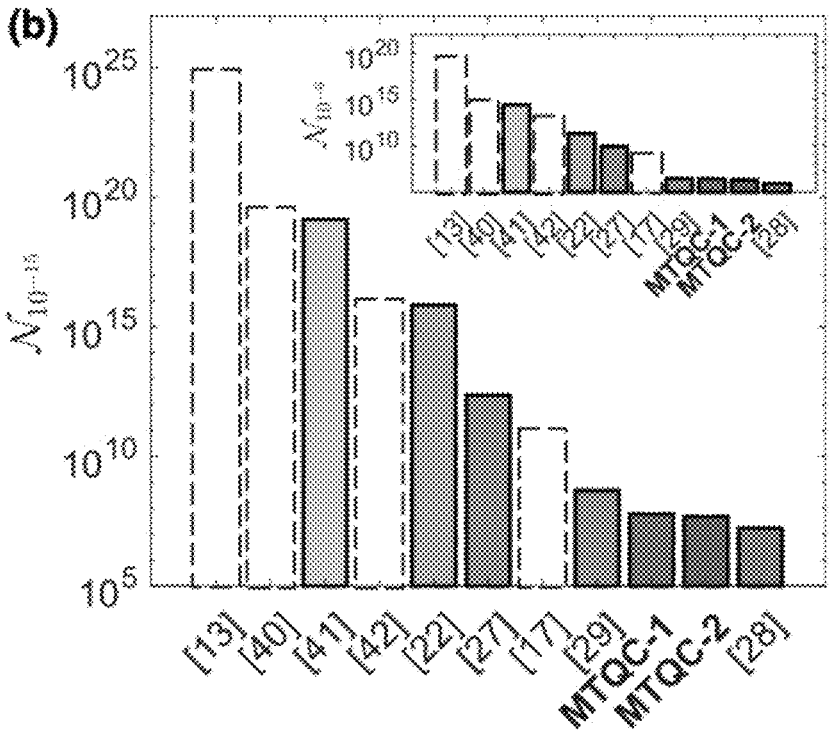

Referring to FIG. 16A and FIG. 16B, the diagrams are the graphs illustrating the photon loss threshold ($\eta_{th}$) and resource cost ($N_{10^{-6}} N_{10^{-15}}$) of the present invention MTQC-1, MTQC-2) and the prior art ([29], [28], [13], [40], [41], [42], [17], [27], [22]) in an environment using m=1, l=3, k=2, HIC and one-photon discrimination photon detectors. $N_{10^{-15}}$ is the total number of GHZ-3s to achieve a logical error rate of 10-15 at a photon loss rate of 1%. Referring to FIG. 16A, it may be seen that the present invention (MTQC-1, MTQC-2) achieves a photon loss threshold of approximately 10% in the environment using m=1, l=3, k=2, HIC and one-photon-sensitive photon detectors. Referring to FIG. 16*b*, it may be understood that the present invention (MTQC-1, MTQC-2) has a resource cost of 10 6 or less and the resource cost of $10^7$ or less in an environment using m=1, l=3, k=2, HIC and one-photon discrimination photon detectors.

According to the embodiments of the present invention described above, the present invention may remarkably improve the error problem of quantum computing even when using relatively few resources by using multi-photon qubits in which a plurality of photons is entangled. Quantum computing technology using conventional photonic qubits is vulnerable to optical loss. Specifically, the maximum allowable optical loss is around 1% for the implementation of error-tolerant quantum computing which may withstand errors, but the present invention remarkably increased the allowable optical loss by more than 10% s based on a multiphoton entangled state and Bell state measurement (BSM) technology. Considering a fact that the error tolerance of conventional photon qubit-based techniques obtained through equivalent level analysis is less than 1%, the present invention maximizes the error tolerance by more than 10 times. In addition, the resource requirement required for such an object also belongs to the lowest (i.e., the most efficient) level among the conventional quantization technology. Specifically, the present invention is based on a method of constructing a Raussendorf-Harrington-Goyal (RHG) lattice required for quantum computing from Greenberger-Horne-Zeilinger (GHZ) entangled photon states consisting of three photons, and in particular, the present invention may significantly improve error tolerance and resource requirements through the concept of a central side qubit encoding and a side qubit encoding.

The present invention relates to the implementation of a quantum computer, and enables accurate quantum computing by efficiently correcting errors occurring in qubits. In particular, the high error rate problem which is difficult to avoid may be solved by using relatively few resources when implementing quantum computing using photon qubits.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method for linear optical quantum computing comprising:
configuring at least two first Greenberger-Horne-Zeilinger (GHZ) states consisting of three photons;
configuring at least one second GHZ state consisting of four or more photons by firstly combining the at least two first GHZ states;
generating at least one microcluster of type 1 comprising a specific entangled state consisting of three multiphoton qubits defined as (n, m) parity-state encoding for two side qubits and (l, k) parity-state encoding for one central qubit and at least two or more microcluster of type 2 containing a specific entangled state consisting of three multiphoton qubits defined by (n, m) parity state coding for three side qubits, by secondly combining the first GHZ state, the second GHZ state, or a combination thereof;
forming a plurality of star clusters consisting of four side qubits around the central qubit by thirdly combining the at least one microcluster of type 1 and the at least two microclusters of type 2;
configuring Raussendorf-Harrington-Goyal (RHG) lattice by using the plurality of star clusters; and
measuring at least one central qubit of the RHG lattice.

2. The method for linear optical quantum computing of claim 1, wherein the step for configuring the at least one second GHZ state includes:
selecting a first photon from any one of the at least two first GHZ states;
selecting a second photon from another first GHZ state; and performing a first Bell-state measurement (BSM) based on the first photon and the second photon.

3. The method for linear optical quantum computing of claim 2, further comprising:
selecting a third photon from any one of the at least two first GHZ states;
selecting a fourth photon from any one of at least one second GHZ state; and
performing a second BSM based on the third photon and the fourth photon.

4. The method for linear optical quantum computing of claim 2, wherein the first BSM comprises:
a single photon BSM comprising a plurality of polarizing beam splitters;
a plurality of wave plates; and
a plurality of photon detectors;
wherein the photon detector may include any one of an on-off detector and a single-photon resolving detector.

5. The method for linear optical quantum computing of claim 1, wherein H-configuration for determining the quantum state of side qubits in the microcluster of type 1 and type 2 is used, the H-configuration includes a H-configuration of type 1 (HIC) and a H-configuration of type 2 (HIS), the HIC of the microcluster of type 1 is defined by Equation a, and the HIS of the microcluster of type 1 is defined by Equation b, $$\frac{1}{\sqrt{2}}(|0_{(n,m)}\rangle|0_{(l,k)}\rangle|0_{(n,m)}\rangle+|1_{(n,m)}\rangle|1_{(l,k)}\rangle|1_{(n,m)}\rangle) \qquad \text{[Equation a]}$$

$$\frac{1}{\sqrt{2}}(|+_{(n,m)}\rangle|0_{(l,k)}\rangle|+_{(n,m)}\rangle+|-_{(n,m)}\rangle|1_{(l,k)}\rangle|-_{(n,m)}\rangle) \qquad \text{[Equation b]}$$

here, the following equation is defined as $$|+_{(n,m)}\rangle = \frac{1}{\sqrt{2}}(|0_{(n,m)}\rangle+|1_{(n,m)}\rangle) \text{ and } |+_{(l,k)}\rangle$$

is similarly defined.

6. The method for linear optical quantum computing of claim 1, wherein H-configuration for determining the quantum state of side qubits in the microcluster of type 2 is used, the H-configuration includes H-configuration of a type 1 (HIC) and a H-configuration of a type 2 (HIS), the HIC of the microcluster of type 2 is defined by Equation c, and the HIS of the microcluster of type 2 is defined by Equation d, $$\frac{1}{\sqrt{2}}(|0_{(n,m)}\rangle|0_{(n,m)}\rangle|+_{(n,m)}\rangle+|1_{(n,m)}\rangle|1_{(n,m)}\rangle|-_{(n,m)}\rangle) \qquad \text{[Equation c]}$$

$$\frac{1}{\sqrt{2}}(|0_{(n,m)}\rangle|+_{(n,m)}\rangle|+_{(n,m)}\rangle+|1_{(n,m)}\rangle|-_{(n,m)}\rangle|-_{(n,m)}\rangle). \qquad \text{[Equation d]}$$

7. The method for linear optical quantum computing of claim 1, wherein a step for configuring the plurality of star clusters comprises:
performing a first multi-photon Bell-state measurement (multi-photon BSM) based on a first side qubit of the microcluster of type 1 and a second side qubit of any one of the microcluster of type 2; and
performing a second multi-photon BSM based on the third side qubit of the microcluster of type 1 and the second side qubit of another of the microcluster of type 2, wherein the first side qubits and third side qubits of the microcluster of type 1 and the second side qubits of the microcluster of type 2 are removed through the first multi-photon BSM and the second multi-photon BSM, wherein the star cluster is composed of first central qubits of the microcluster of type 1, first side qubits and third side qubits of the microcluster of type 2.

8. The method for linear optical quantum computing of claim 1, wherein the step for forming the plurality of star clusters includes a concatenated Bell-state measurement (multi-photon BSM) which performs block level BSM n times and performs a single-photon BSM m times for a level BSM of each block when two multiphoton qubits are defined as (n, m) parity state coding.

9. The method for linear optical quantum computing of claim 1, wherein the step for configuring the Raussendorf-Harrington-Goyal (RHG) lattice by using the plurality of star clusters comprises:

performing a third multi-photon Bell-state measurement (multi-photon BSM) by using a first side qubit of a first star cluster and a third side qubit of a second star cluster among the plurality of star clusters; and performing a fourth multi-photon BSM by using a third side qubit of the first star cluster and a first side qubit of the second star cluster.

10. The method for linear optical quantum computing of claim 1, wherein the first star cluster is disposed at a center of a corresponding plane constituting the RHG lattice, and the second star cluster is disposed at a center of a line segment constituting the corresponding plane.

11. The method for linear optical quantum computing of claim 1, wherein the step for configuring the microcluster of type 1 and type 2 includes at least one of:

selecting a first photon from any one of the at least two first GHZ states, selecting a second photon from another first GHZ state, and performing a first fusion based on the first photon and the second photon;

selecting a third photon from any one of the first GHZ states, selecting a fourth photon from any one of the second GHZ states, and performing a second fusion based on the third photon and the fourth photon; and selecting a fifth photon from any one of the second GHZ states, selecting a sixth photon from another second GHZ state, and performing a third fusion based on the fifth photon and the sixth photon.

12. The method for linear optical quantum computing of claim 11, wherein in cases of m=k=1 for a first H-configuration of the microcluster of type 1 (HIC), n=k=1 for a second H-configuration of the microcluster of type 1 (HIS), or n=m=1 of the microcluster of the type 2, the first fusion, the second fusion, and the third fusion are not performed, and a single photon Hadamard gate is applied to at least some or all of the photons not participating in the first fusion, the second fusion and the third fusion.

13. A method for linear optical quantum computing comprising:

determining a combination graph, wherein the combination graph comprises a plurality of vertices representing microclusters and a plurality of lines connecting the vertices, each line corresponding to a single-photon fusion or a Bell-State Measurement;

determining a sequence of a plurality of single photon fusions and a plurality of single photon Bell-state measurements (BSMs) expressed by a shape of the combination graph and one or more lines between the vertices by performing a resource optimization algorithm for the combination graph consisting of a plurality of vertices representing an arbitrary microcluster and lines connecting the vertices;

configuring at least two first Greenberger-Horne-Zeilinger (GHZ) states consisting of three photons based on the shape of the combination graph;

generating at least one microcluster of type 1 including a specific entangled state consisting of three multiphoton qubits defined by (n, m) parity-state encoding for two side qubits and (l, k) parity-state encoding for one central qubit, and at least two or more microclusters of type 2 comprising a specific entangled state consisting of three multiphoton qubits defined by (n, m) parity state coding for three side qubits, based on the sequence of the single photon fusions and the single photon BSMs between the configured first GHZ states;

forming a plurality of star clusters consisting of four side qubits around the central qubit by combining the at least one microcluster of type 1 and the at least two microclusters of type 2;

configuring a Raussendorf-Harrington-Goyal (RHG) lattice by using the plurality of star clusters; and measuring at least one central qubit of the RHG lattice.

14. An apparatus for linear optical quantum computing comprising at least one processor, at least one single-photon BSM and at least one multi-photon Bell-state measurement (multi-photon BSM) operating under the control of the processor, wherein the at least one processor includes commands for:

configuring at least two first Greenberger-Horne-Zeilinger (GHZ) states consisting of three photons;

configuring at least one second GHZ state consisting of four or more photons by firstly combining the at least two first GHZ states;

generating at least one microcluster of type 1 comprising a specific entangled state consisting of three multiphoton qubits defined as (n, m) parity-state encoding for two side qubits and (l, k) parity-state encoding for one central qubit and at least two or more microcluster of type 2 containing a specific entangled state consisting of three multiphoton qubits defined by (n, m) parity state coding for three side qubits, by secondly combining the first GHZ state, the second GHZ state, or a combination thereof;

forming a plurality of star clusters consisting of four side qubits around the central qubit by thirdly combining the at least one microcluster of type 1 and the at least two microclusters of type 2;

configuring Raussendorf-Harrington-Goyal (RHG) lattice by using the plurality of star clusters; and measuring at least one central qubit of the RHG lattice.

15. The apparatus for linear optical quantum computing of claim 14, wherein the at least one processor further includes a command for controlling to select a first photon from any one of the at least two first GHZ states, select a second photon from another first GHZ state, and perform a first Bell-state measurement (BSM) based on the first photon and the second photon.

16. The apparatus for linear optical quantum computing of claim 15, wherein the at least one processor further includes a command for selecting a third photon from any one of the at least two first GHZ states, selecting a fourth photon from any one of at least one second GHZ state; and performing a second BSM based on the third photon and the fourth photon.

17. The apparatus for linear optical quantum computing of claim 15, wherein the first BSM includes:

a single photon BSM comprising a plurality of polarizing beam splitters;

a plurality of wave plates; and a plurality of photon detectors, wherein the photon detector includes any one of an on-off detector and a single-photon resolving detector.

18. The apparatus for linear optical quantum computing of claim 14, wherein H-configuration for determining the quantum state of side qubits in the microcluster of type 1 and type 2 is used, the H-configuration includes a H-configuration of type 1 (HIC) and a H-configuration of type 2 (HIS), the HIC of the microcluster of type 1 is defined by Equation a, and the HIS of the microcluster of type 1 is defined by Equation b, $$\frac{1}{\sqrt{2}}(|0_{(n,m)}\rangle|0_{(l,k)}\rangle|0_{(n,m)}\rangle+|1_{(n,m)}\rangle|1_{(l,k)}\rangle|1_{(n,m)}\rangle) \qquad \text{[Equation a]}$$

$$\frac{1}{\sqrt{2}}(|+_{(n,m)}\rangle|0_{(l,k)}\rangle|+_{(n,m)}\rangle+|-_{(n,m)}\rangle|1_{(l,k)}\rangle|-_{(n,m)}\rangle) \qquad \text{[Equation b]}$$

wherein H-configuration for determining the quantum state of side qubits in the microcluster of type 2 is used, the H-configuration includes H-configuration of a type 1 (HIC) and a H-configuration of a type 2 (HIS), the HIC of the microcluster of type 2 is defined by Equation c, and the HIS of the microcluster of type 2 is defined by Equation d, $$\frac{1}{\sqrt{2}}(|0_{(n,m)}\rangle|0_{(n,m)}\rangle|+_{(n,m)}\rangle+|1_{(n,m)}\rangle|1_{(n,m)}\rangle|-_{(n,m)}\rangle) \qquad \text{[Equation c]}$$

$$\frac{1}{\sqrt{2}}(|0_{(n,m)}\rangle|+_{(n,m)}\rangle|+_{(n,m)}\rangle+|1_{(n,m)}\rangle|-_{(n,m)}\rangle|-_{(n,m)}\rangle). \qquad \text{[Equation d]}$$

19. The apparatus for linear optical quantum computing of claim 14, wherein the at least one processor controls the multi-photon BSM, so that a first multi-photon BSM is performed based on a first side qubit of the microcluster of type 1 and a second side qubit of any one of the microcluster of type 2, wherein a second multi-photon BSM is performed based on a third side qubit of the microcluster of type 1 and a second side qubit of another one of the microcluster of type 2, wherein the first side qubits and third side qubits of the microcluster of type 1 and the second side qubits of the microcluster of type 2 are removed through the first multi-photon BSM and the second multi-photon BSM, wherein the star cluster is composed of a first central qubit of the microcluster of type 1 and first side qubits and third side qubits of the microclusters of type 2.

20. The apparatus for linear optical quantum computing of claim 14, wherein the at least one processor controls the multi-photon BSM, so that a third multi-photon BSM is performed based on a first side qubit of a first star cluster and a third side qubit of a second star cluster of the plurality of star clusters, and a fourth multi-photon BSM is performed based on a third side qubit of the first star cluster and a first side qubit of the second star cluster.

21. The apparatus for linear optical quantum computing of claim 14, wherein the at least one processor includes:

at least one of a command for selecting a first photon from any one of the at least two first GHZ states, selecting a second photon from another first GHZ state, and performing a first fusion based on the first photon and the second photon;

a command for selecting a third photon from any one of the first GHZ state, selecting a fourth photon from any one of the second GHZ state, and performing a second fusion based on the third photon and the fourth photon; and a command for selecting a fifth photon from any one of the at least two second GHZ states, selecting a sixth photon from another second GHZ state, and performing a third fusion based on the fifth photon and the sixth photon.

22. The apparatus for linear optical quantum computing of claim 21, wherein in cases of m=k=1 for a first H-configuration of the microcluster of type 1 (HIC), n=k=1 for a second H-configuration of the microcluster of type 1 (HIS), or n=m=1 of the microcluster of the type 2, the first fusion, the second fusion, and the third fusion are not performed, and a single photon Hadamard gate is applied to at least some or all of the photons not participating in the first fusion, the second fusion and the third fusion.

\*    \*    \*    \*    \*